USO11423178B2

(12) United States Patent
Glasco et al.

(10) Patent No.: US 11,423,178 B2
(45) Date of Patent: Aug. 23, 2022

(54) ISOLATION OF SUBSYSTEMS ON A SYSTEM ON A CHIP

(71) Applicant: TESLA, INC., Palo Alto, CA (US)

(72) Inventors: David Glasco, Austin, TX (US); Patryk Kaminski, Austin, TX (US); Thaddeus Fortenberry, Dripping Springs, TX (US)

(73) Assignee: Tesla, Inc., Austin, TX (US)

( * ) Notice: Subject to any disclaimer, the term of this patent is extended or adjusted under 35 U.S.C. 154(b) by 283 days.

(21) Appl. No.: 16/388,451

(22) Filed: Apr. 18, 2019

(65) Prior Publication Data

US 2019/0332816 A1 Oct. 31, 2019

Related U.S. Application Data

(60) Provisional application No. 62/663,447, filed on Apr. 27, 2018.

(51) Int. Cl.
*G06F 21/71* (2013.01)
*G06F 21/60* (2013.01)
*G06F 21/76* (2013.01)

(52) U.S. Cl.
CPC ............ *G06F 21/71* (2013.01); *G06F 21/606* (2013.01); *G06F 21/602* (2013.01); *G06F 21/76* (2013.01)

(58) Field of Classification Search
CPC ...... G06F 21/71; G06F 21/606; G06F 21/602; G06F 21/76

(Continued)

(56) References Cited

U.S. PATENT DOCUMENTS

| 8,843,706 B2 * | 9/2014 | Heil | ........... G06F 12/128 |
| | | | 711/118 |
| 2004/0006584 A1 * | 1/2004 | Vandeweerd | ........ G06F 30/33 |
| | | | 718/107 |

(Continued)

OTHER PUBLICATIONS

Becsi,"Security Issues and Vulnerabilities in Connected Car Systems", Jun. 2015, MT-ITS, pp. 1-6 (Year: 2015).*

(Continued)

*Primary Examiner* — Taghi T Arani
*Assistant Examiner* — Gregory A Lane
(74) *Attorney, Agent, or Firm* — Knobbe, Martens, Olson & Bear, LLP

(57) ABSTRACT

A System on a Chip (SoC) includes a plurality of general purpose processors, a plurality of application specific processors, a plurality of SoC support processing components, a security processing subsystem (SCS), a general access Network on a Chip (NoC) coupled to and servicing communications between the plurality of general purpose processors and the plurality of SoC support components, and a proprietary access NoC coupled to and servicing communications for the plurality of application specific processors and the SCS. The SoC may further include a safety processor subsystem (SMS) coupled to the proprietary access NoC, wherein the proprietary access NoC further services communications for the SMS and isolates communications of the SMS from communications of the plurality of general purpose processors. The general access NoC and the proprietary access NoC isolate communications of the SCS and the SMS from communications of the plurality of general purpose processors.

16 Claims, 18 Drawing Sheets

(58) Field of Classification Search
USPC .......................................................... 726/26
See application file for complete search history.

(56) References Cited

U.S. PATENT DOCUMENTS

| | | | | |
|---|---|---|---|---|
| 2005/0172105 A1* | 8/2005 | Doering | ................ | G06F 9/3879 |
| | | | | 712/36 |
| 2009/0070728 A1* | 3/2009 | Solomon | ................ | G06F 30/30 |
| | | | | 716/128 |
| 2009/0271597 A1* | 10/2009 | Kuesel | ................ | G06F 9/3844 |
| | | | | 712/240 |
| 2010/0169857 A1* | 7/2010 | Campi | ................ | G06F 30/39 |
| | | | | 716/55 |
| 2010/0284539 A1 | 11/2010 | Roy et al. | | |
| 2012/0066545 A1* | 3/2012 | Abe | ................ | G06F 11/1654 |
| | | | | 714/5.1 |
| 2014/0068246 A1 | 3/2014 | Hartley et al. | | |
| 2014/0093074 A1 | 4/2014 | Gotze et al. | | |
| 2015/0358158 A1 | 12/2015 | Fadaie et al. | | |
| 2016/0063164 A1* | 3/2016 | Brillu | ................ | G06F 9/5066 |
| | | | | 716/132 |
| 2017/0060204 A1* | 3/2017 | Gangwar | ................ | G06F 1/26 |
| 2017/0207998 A1* | 7/2017 | Fraisse | ................ | H04L 49/101 |
| 2017/0223030 A1* | 8/2017 | Merza | ................ | H04L 63/1416 |
| 2018/0084181 A1* | 3/2018 | Sachs | ................ | H04N 5/23254 |
| 2018/0365069 A1 | 12/2018 | Nemiroff et al. | | |
| 2018/0370540 A1* | 12/2018 | Yousuf | ................ | B60W 50/023 |
| 2019/0158293 A1 | 5/2019 | Chen et al. | | |
| 2019/0243961 A1* | 8/2019 | Ollivier | ................ | G06F 21/57 |
| 2019/0303328 A1* | 10/2019 | Balski | ................ | G06F 15/7807 |

OTHER PUBLICATIONS

Sicari, 2015, Security, privacy and trust in internet of things: the road ahead, Computer Networks, pp. 146-164.

* cited by examiner

ISOLATION OF SUBSYSTEMS ON A SYSTEM ON A CHIP

CROSS-REFERENCE TO RELATED APPLICATIONS

The present U.S. Utility Patent Application claims priority pursuant to 35 U.S.C. § 119(e) to U.S. Provisional Application No. 62/663,447, entitled "ISOLATION OF SUBSYSTEMS ON A SYSTEM ON A CHIP", filed Apr. 27, 2018, which is hereby incorporated herein by reference in its entirety and made part of the present U.S. Utility Patent Application for all purposes.

BACKGROUND

Technical Field

The present disclosure relates to a System on Chip; and more particularly to communications within a System on a Chip.

Description of Related Art

A system on a Chip (SoC) includes a plurality of processing systems arranged on a single integrated circuit. Each of these separate processing systems typically performs a corresponding set of processing functions. The separate processing systems typically interconnect via one or more communication bus structures. Some SoCs are deployed within systems that have high security requirements, e.g., financial processing systems, autonomous driving systems, medical processing systems, and air traffic control systems, among others. With these systems, multiple SoCs may operate in parallel on common input data to enhance system reliability.

Typical SoCs have multiple subsystems that are usually interconnected by a common Network-on-Chip (NoC) and share a common memory system. Isolation of these subsystems is typically achieved through programming the NoC reachability mechanism, memory map and/or memory management. This is often controlled either through privileged Central Processing Unit (CPU) accesses, secure CPU accesses, or using a hypervisor mechanism. In all of these implementations, a subsystem that is booted, e.g., hypervisor mechanism or Operating System (OS), has complete control and accessibility to all subsystems. Because the OS may be more readily compromised than more secure SoC components, allowing the OS to have access to all SoC components jeopardizes the security and reliability of the SoC.

SUMMARY

In order to overcome the above-described shortcomings among other shortcomings, a System on a Chip (SoC) according to a first embodiment of the present disclosure includes a plurality of general purpose processors, a plurality of application specific processors, a plurality of SoC support processing components, a security processing subsystem (SCS), a general access Network on a Chip (NoC) coupled to and servicing communications between the plurality of general purpose processors and the plurality of SoC support components, and a proprietary access NoC coupled to and servicing communications for the plurality of application specific processors and the SCS.

The first embodiment may include a number of optional aspects. According to a first optional aspect, the SoC further includes a safety processor subsystem (SMS) coupled to the proprietary access NoC, wherein the proprietary access NoC further services communications for the SMS and isolates communications of the SMS from communications of the plurality of general purpose processors. According to a variation of the first aspect, the plurality of SoC support processing components includes at least a memory interface and an input/output (I/O) interface and the proprietary access NoC further couples to the memory interface and to the I/O interface to service communications therewith for the plurality of application specific processors and the SMS.

According to a second optional aspect of the first embodiment, the general access NoC and the proprietary access NoC isolate communications of the SCS from communications of the plurality of general purpose processors. Further, according to a third optional aspect, the general access NoC and the proprietary access NoC isolate communications of the plurality of application specific processors from communications of the plurality of general purpose processors.

According to a fourth optional aspect of the first embodiment, the plurality of SoC support processing components includes at least a memory interface and an input/output (I/O) interface and the proprietary access NoC further couples to the memory interface and to the I/O interface to service communications therewith for the plurality of application specific processors and the SCS.

According to a second embodiment of the present disclosure, a SoC includes a plurality of general purpose processors, a plurality of application specific processors, a plurality of SoC support processing components, a security processing and safety processing subsystem (SCS/SMS), a general access NoC coupled to and servicing communications between the plurality of general purpose processors and the plurality of SoC support components and a proprietary access NoC coupled to and servicing communications for the plurality of application specific processors and the SCS/SMS.

According to a first optional aspect of the second embodiment, the plurality of SoC support processing components includes at least a memory interface and an input/output (I/O) interface and the proprietary access NoC further couples to the memory interface and to the I/O interface to service communications therewith for the plurality of application specific processors and the SCS/SMS.

According to a second optional aspect of the second embodiment, the general access NoC and the proprietary access NoC isolate communications of the SCS/SMS from communications of the plurality of general purpose processors.

According to a third optional aspect of the second embodiment, the general access NoC and the proprietary access NoC isolate communications of the plurality of application specific processors from communications of the plurality of general purpose processors.

According to a fourth optional aspect of the second embodiment, the plurality of SoC support processing components includes at least a memory interface and an input/output (I/O) interface and the proprietary access NoC further couples to the memory interface and to the I/O interface to service communications therewith for the plurality of application specific processors and the SCS/SMS.

The SoC of the first or second embodiment may service particular processing requirements of autonomous driving operations, financial services transactions, air traffic control operations, or medical processing transactions.

According to a third embodiment of the present disclosure, a method for operating a SoC includes a general access NoC services communications among a plurality of general purpose processors and a plurality of SoCs support processing components, a proprietary access NoC servicing communications among a plurality of application specific processors and a SCS, and the general access NoC and the proprietary access NoC preclude communications between the plurality of general purpose processors and the SCS.

According to a first optional aspect of the third embodiment, the general access NoC and the proprietary access NoC preclude communications between the plurality of general purpose processors and the plurality of application specific processors.

According to a second optional aspect of the third embodiment, the proprietary access NoC servicing communications among the plurality of application specific processors, the SCS, and a SMS and the general access NoC and the proprietary access NoC preclude communications between the plurality of general purpose processors and the SMS.

According to a third optional aspect of the third embodiment, the proprietary access NoC selectively services communications between a memory interface and an I/O interface of the plurality of SoC support processing components, the plurality of application specific processors, the SCS, and the SMS.

According to a fourth optional aspect of the third embodiment, the proprietary access NoC selectively services communications between a memory interface and an I/O interface of the plurality of SoC support processing components, the plurality of application specific processors, and the SCS.

According to a fourth embodiment of the present disclosure, a method includes a general access NoC servicing communications among a plurality of general purpose processors and a plurality of SoC support processing components, a proprietary access NoC servicing communications among a plurality of application specific processors and a SCS/SMS, and the general access NoC and the proprietary access NoC precluding communications between the plurality of general purpose processors and the SCS/SMS.

According to a first optional aspect of the fourth embodiment, the general access NoC and the proprietary access NoC preclude communications between the plurality of general purpose processors and the plurality of application specific processors.

According to a second optional aspect of the fourth embodiment, the proprietary access NoC selectively servicing communications between a memory interface and an I/O interface of the plurality of SoC support processing components, the plurality of application specific processors, and the SCS/SMS.

The embodiments of the present disclosure provide important benefits as compared to the prior structures and operations. By having both a general access NoC and a proprietary access NoC, non-secure components of the SoC, e.g., general purpose processors, are isolated from secure components of the SoC, e.g., SCS, SMS, SCS/SMS, and the plurality of application specific processors. Thus, the SoC is less at risk from attack by malware and malicious attack. Further benefits of the disclosed embodiments will become apparent from reading the detailed description below with reference to the drawings.

DETAILED DESCRIPTION OF THE DISCLOSURE

Described herein are structures and operations that support secure communications within an SoC. These structures and operations will be described herein with reference to SoCs that are used in autonomous driving systems, financial services systems, air traffic control systems, and medical processing systems. The teachings of the present disclosure may be applied to SoCs that are used in other types of systems as well, the teachings are not limited to the SoCs described herein, and the teachings may be applied to SoCs of many differing types of systems. Nonetheless, the embodiments described herein will frequently relate to autonomous driving systems. The reader will appreciate that the teachings of the present disclosure could be applied to many other systems in which the secure provisioning of SoCs is beneficial.

Figure 1A:
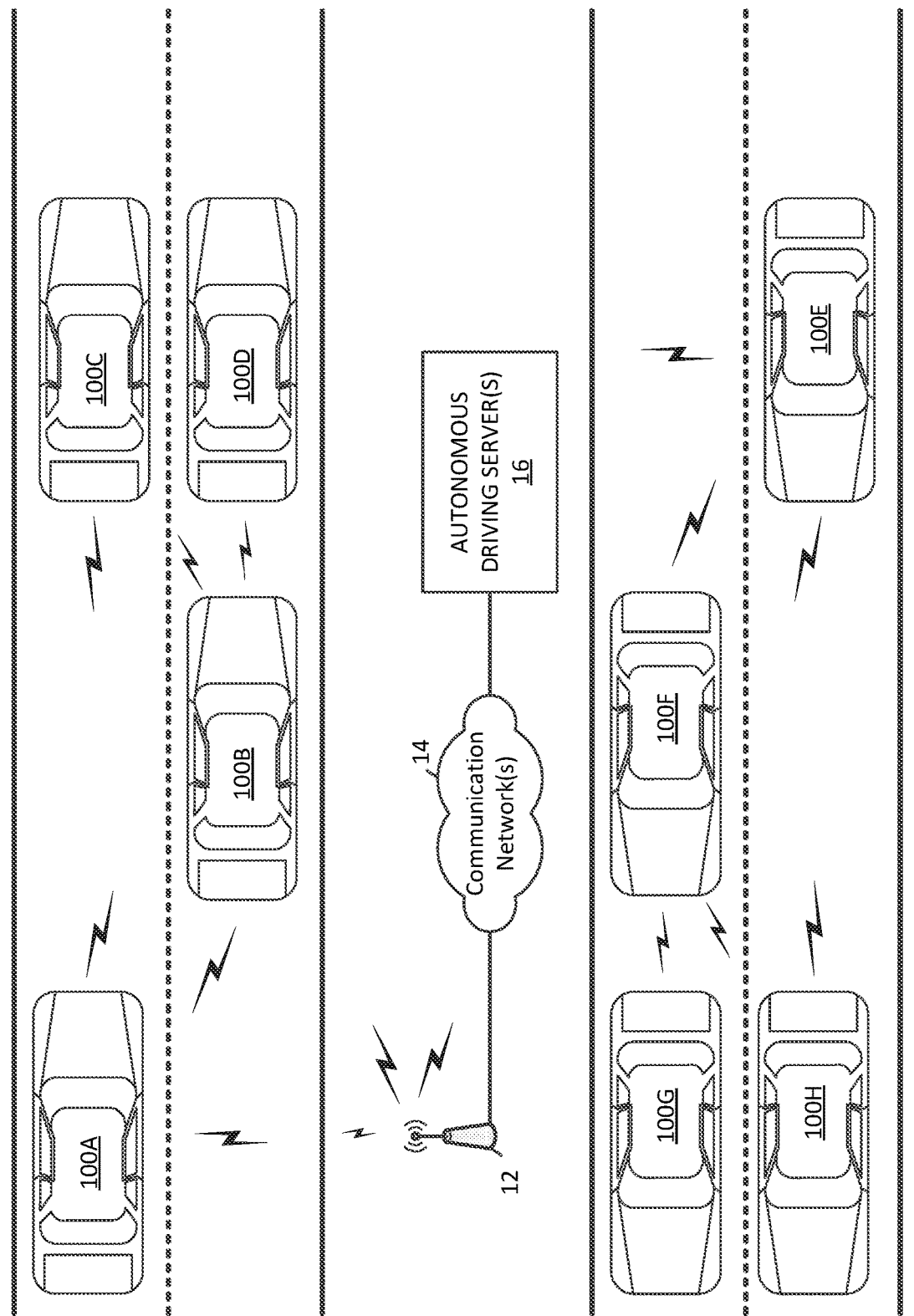
FIG. 1A is a diagram illustrating a group of vehicles, at least one of which is constructed and operates according to a described embodiment to support autonomous driving.

FIG. 1A is a diagram illustrating a group of vehicles, at least one of which is constructed and operates according to a described embodiment to support autonomous driving. Vehicles 100A-110D are traveling in a first direction and vehicles 100E-110H are traveling in a second direction. At least some of these vehicles 100A-100H support autonomous driving according to one or more embodiments described subsequently herein. The vehicles 100A-100H support intra-vehicular communications, extra-vehicular communications, and inter-vehicular communications. Intra-vehicular communications occur within a particular vehicle. Extra-vehicular communications occur between a vehicle and one or more devices external to the vehicle, e.g., between vehicle 100A and wireless access point 12, e.g., cellular base station, WiFi access point, or another wireless device. An example of such extra-vehicular communications is those between the vehicle 100A and an autonomous driving server 16 via communication network 14. These communications may relate to current autonomous driving data/situations or may include data gathered by the vehicle 100A for subsequent use by the autonomous driving server 16.

Inter-vehicular communications are a sub-set of extra-vehicular communications and are communications between two or more vehicles, e.g., 100A, 100B, 100C and 100F. These communications may relate to autonomous driving, e.g., identifying other vehicle, data exchange, vehicle driving warnings, etc. The inter-vehicular communications may be direct communications between vehicles, e.g., between vehicles 100A and 100C, or indirect communications that are relayed by wireless access point 12, either directly or via the communication network 14, the autonomous driving server, or another server. Because the vehicles 100A-110H support a wide variety of operations, they are potentially susceptible to unwanted and undesirable communications. In a particularly bad scenario, while a vehicle, e.g., 100F, is driving autonomously, it may receive a malicious communication from another vehicle, e.g., 100E or via the wireless access point 12, falsely notifying the vehicle 100F of an impending crash or other autonomous driving event. In response to this malicious communication, the vehicle 100E may automatically take a defensive maneuver that does cause a crash or near crash. Of course, this type of event is very undesirable. While it is desirable, from an autonomous driving standpoint, to receive as much input data as possible to make good autonomous driving decisions, there must be a safeguard in place to protect the vehicle 100E from malicious communications.

Thus, according to the present disclosure, a vehicle, e.g., 100E, includes an autonomous driving controller having a plurality of parallel processors that operate in parallel on common input data received from a plurality of autonomous driving sensors. Each of the plurality of parallel processors includes a general processor and a security processor subsystem (SCS), and communication circuitry configured to support communications between the plurality of parallel processors, including communications between the general-purpose processors of the plurality of parallel processors and communications between the SCSs of the plurality of parallel processors that may be protected by SCS cryptography. Each of the plurality of parallel processors may each also include a safety processor subsystem (SMS), with the communication circuitry also configured to support communications between the SMSs of the plurality of parallel processors that may be protected by SMS cryptography that differs from the SCS cryptography. This communication cryptography supported by the SCS, the SMS, and the communication circuitry resists malicious communications that would otherwise compromise the autonomous driving system. The autonomous driving controller may include dedicated hardware and/or storage of the SCS and/or SMS to service the communication cryptography.

Figure 1B:
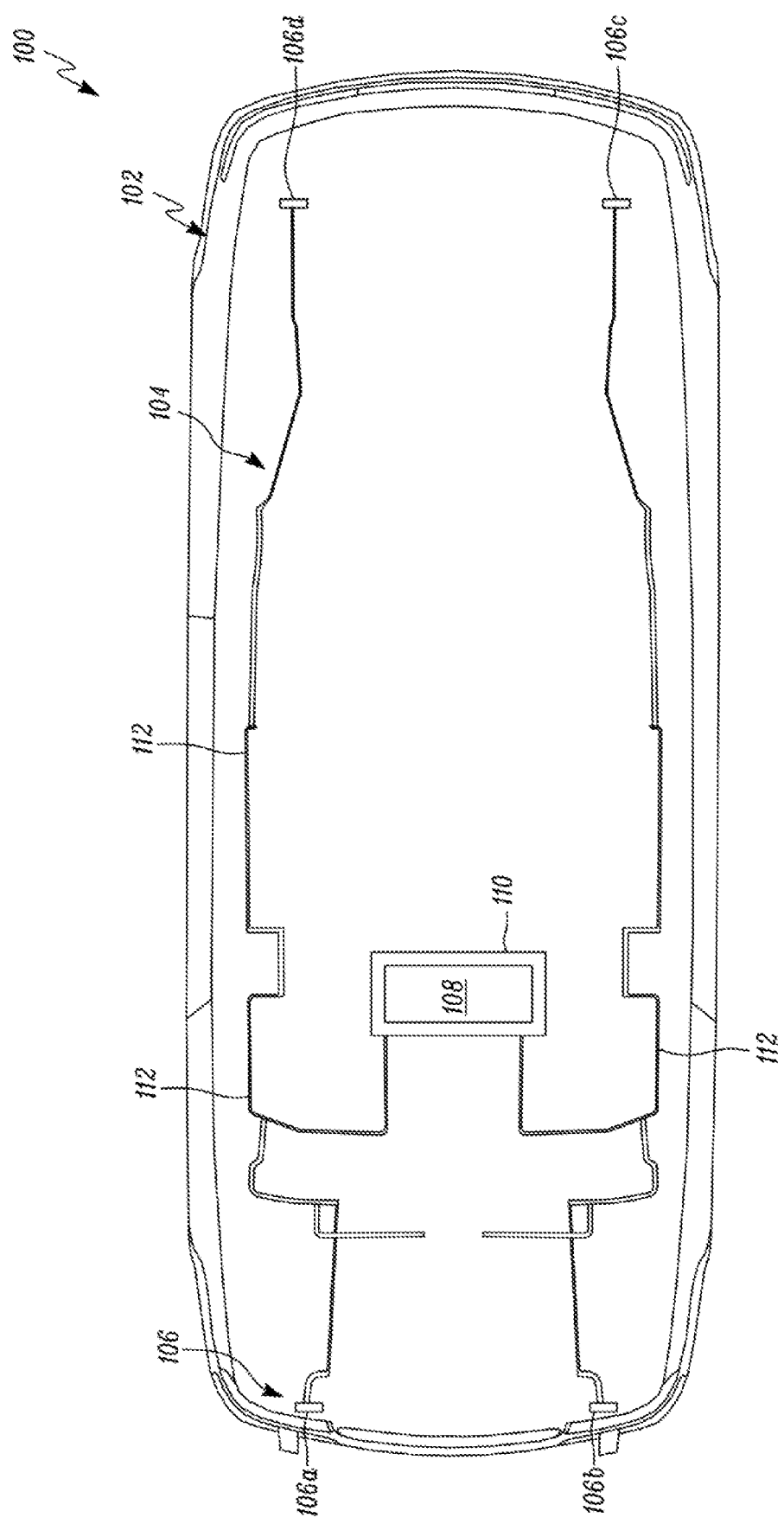
FIG. 1B is a diagram illustrating a vehicle that is constructed and operates according to a described embodiment to support autonomous driving.

FIG. 1B is a diagram illustrating a vehicle that is constructed and operates according to a described embodiment to support autonomous driving. The vehicle 100 includes an autonomous driving controller 108, has a body 102, and includes a wiring system 104 for connecting a plurality of autonomous driving sensors 106 having individual sensors 106a-106d to an autonomous driving controller 108. The wiring system 104 of FIG. 1B is a structural cable 112. The autonomous driving controller 108 may reside on or in or be co-located with an infotainment device 110. The infotainment device 110 may be used to control functions of various components present in the vehicle 100, e.g., to take over control of a steering function associated with a steering system (not shown) of the vehicle 100, a braking function, an acceleration function, or another function of the vehicle 100 related to autonomous driving or collision prevention. These operations of the infotainment device 110 are performed based upon interaction with the autonomous driving controller 108.

The autonomous driving sensors 106a-106d include cameras, RADAR sensors, LIDAR sensors, sonic proximity sensors, or other sensors that collect information relevant to the operation of the vehicle 100. For example, autonomous driving sensors 106a, 106b could be cameras while autonomous driving sensors 106c, 106d could be RADAR sensors. The autonomous driving sensors 106a-106d are communicatively connected to the autonomous driving controller 108 via the structural cable 112. The structural cable 112 may include a single conductor or a pair of conductors and may be twisted pair wiring, coaxial wiring, single conductor wiring, a power bus or wiring, strip wiring, or other wiring.

Figure 1C:
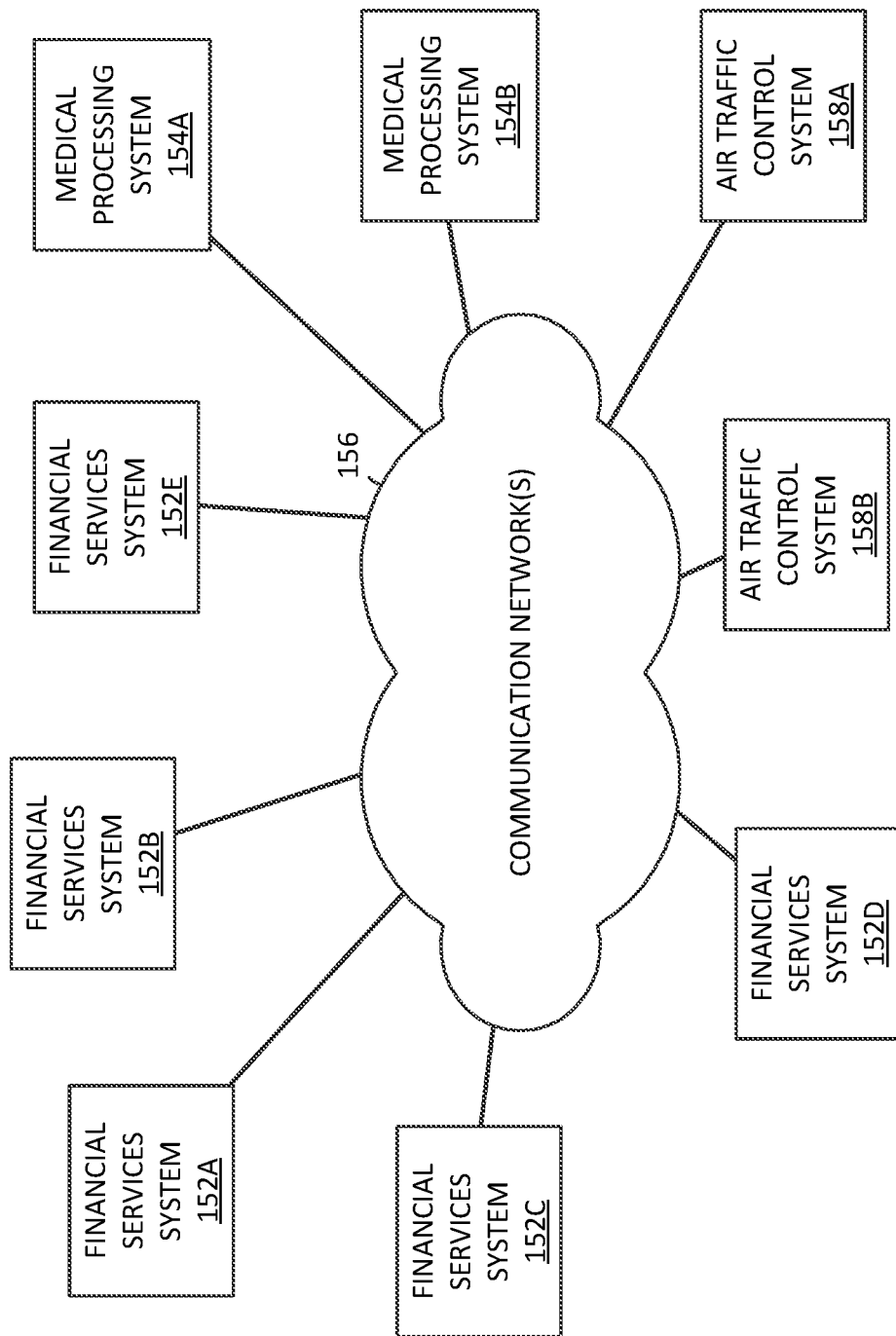
FIG. 1C is a system diagram illustrating a plurality of systems that include SoCs provisioned according to a described embodiment.

FIG. 1C is a system diagram illustrating a plurality of systems that include SoCs provisioned according to a described embodiment. The systems 150 of FIG. 1C include a plurality of financial services systems 152A, 152B, 152C, 152D, and 152E, a plurality of medical processing systems 154A and 154B, and a plurality of air traffic control systems 158A and 158B, that are shown to intercouple via one or more communication networks 156. The communication networks 156 may include the Internet, the World Wide Web (WWW), one or more intranets, one or more virtual Local Area Networks (LANs), one or more LANs, one or more wireless LANs (WLANs), and/or one or more other types of networks. Any of the components of the systems 150 may include a SoC constructed according to the present disclosure, which will be described further herein.

Figure 2:
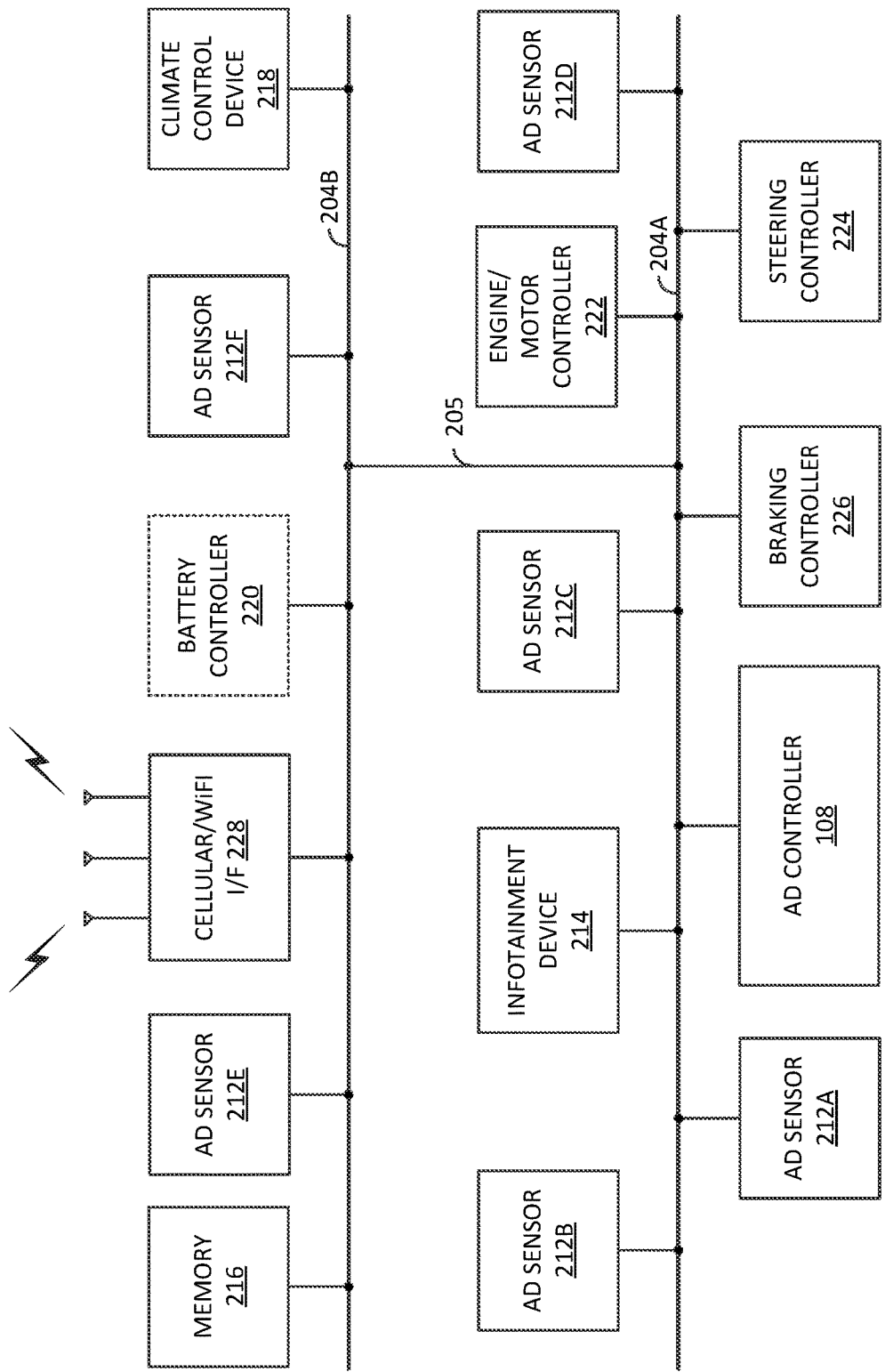
FIG. 2 is a block diagram illustrating an autonomous driving controller constructed and operating according to a first described embodiment.

FIG. 2 is a block diagram illustrating an autonomous driving system 200 constructed and operating according to a described embodiment. The autonomous driving system 200 includes a bus, an autonomous driving controller 108 coupled to the bus, and a plurality of autonomous driving sensors 212A-212F coupled to the bus. In the embodiment of FIG. 2, the bus includes two primary sections 204A and 204B intercoupled by section 205. The bus may be a twisted pair of conductors, a pair of strip conductors, a coaxial conductor, a two conductor power bus that carries DC power, or another structure having one or two conductors to support communications.

A plurality of devices communicates via the bus. These devices include the autonomous driving controller 108, the plurality of autonomous driving sensors 212A-212F, an infotainment device 214, memory 216, a climate control device 218, a battery controller 220 (when the vehicle is an electric vehicle or hybrid vehicle), an engine/motor controller 222, a steering controller 224, a braking controller 226, and a wireless interface 228 that includes multiple wireless interfaces, e.g., cellular, WiFi, Bluetooth, and/or other standards. The plurality of autonomous driving sensors 212A-212F may include one or more RADAR units, one or more LIDAR units, one or more cameras, and/or one or more proximity sensors. The plurality of autonomous driving sensors 212A-212F collect autonomous driving data and transmit the collected autonomous driving data to the autonomous driving controller 108 via the bus. The autonomous driving controller 108 then processes the data and, based on the processing, controls the driving of the vehicle, either fully or driver assisted, via controllers 222, 224, and 226.

Figure 3B:
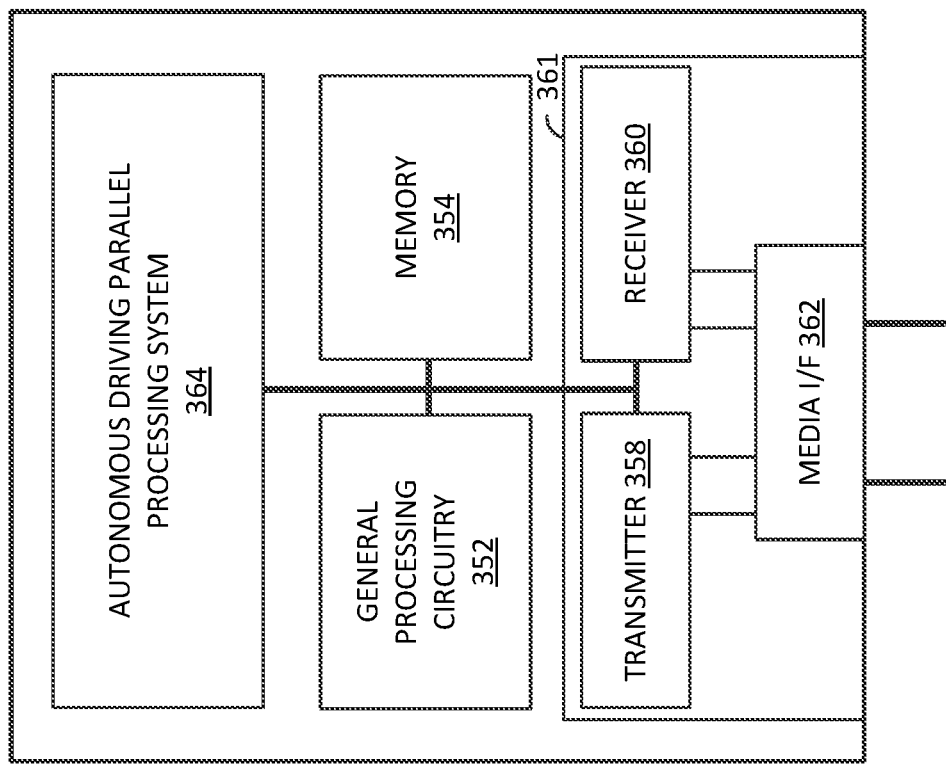
FIG. 3B is a block diagram illustrating an autonomous driving controller constructed according to a described embodiment.
Figure 3A:
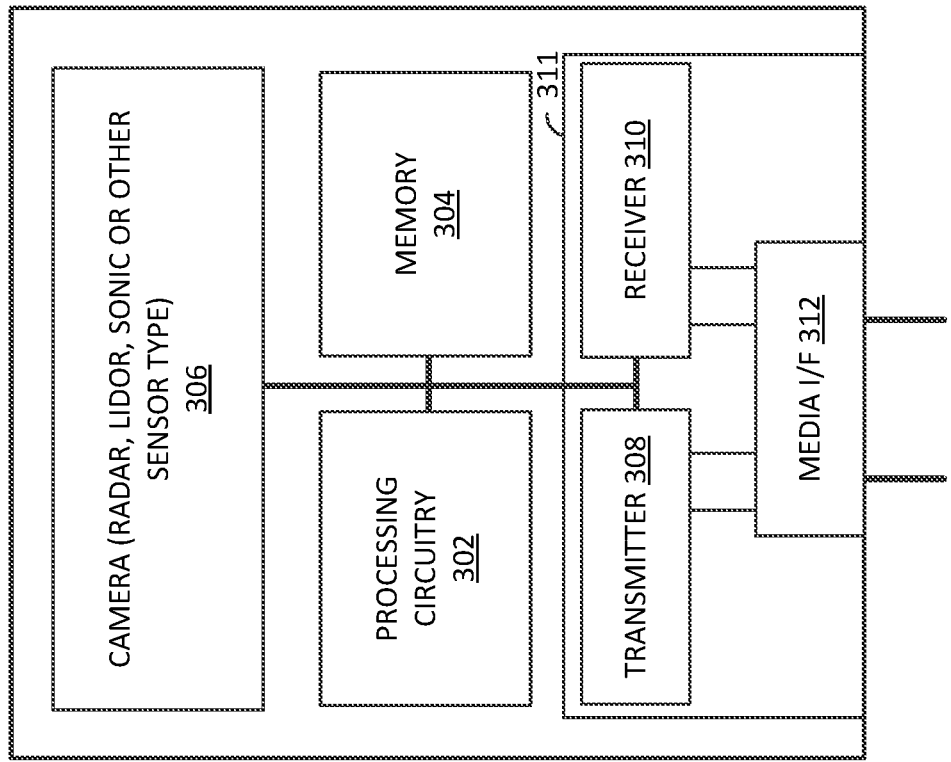
FIG. 3A is a block diagram illustrating an autonomous driving sensor constructed according to a described embodiment.

FIG. 3A is a block diagram illustrating an autonomous driving sensor constructed according to a described embodiment. The autonomous driving sensor 300 includes data collection component 306 configured to collect autonomous driving data. The data collection component 306 may be a RADAR sensor, a LIDAR sensor, a sonic proximity sensor, or another type of sensor. The autonomous driving sensor 300 further includes processing circuitry 302, memory 304, and a transceiver 311 coupled to the processing circuitry 302, to the memory 304, and to the data collection component 306 via a bus. The processing circuitry 302 executes programs stored in memory 304, e.g., autonomous driving emergency operations, reads and writes data from/to memory, e.g., data and instructions to support autonomous driving operations, to interact with the data collection component 306 to control the collection of autonomous driving data, to process the autonomous driving data, and to interact with the transceiver 311 to communicate via the bus, among other operations.

By way of example and not limitation, processing circuitry 302 may be a central processing unit, a microcontroller, a digital signal processor, an application specific integrated circuit, a Judging unit, a Determining Unit, an Executing unit, combinations of any of the foregoing, or any other device suitable for execution of computer programs. By way of example, memory 304 may be dynamic memory, static memory, disk drive(s), flash drive(s), combinations of any of the foregoing, or any other form of computer memory. The memory 304 stores computer programs for operations of the present disclosure, may also store other computer programs, configuration information, and other short-term and long-term data necessary for implementation of the embodiments of the present disclosure.

The transceiver 311 includes a transmitter 308, a receiver 310, and a media I/F 312. The media I/F 312 may be a transmit/receive (T/R) switch, a duplexer, or other device that supports the illustrated coupling. In other embodiments, both the transmitter 308 and receiver 310 couple directly to the bus or couple to the bus other than via the media I/F 312. The transceiver 311 supports communications via the bus. The processing circuitry 302 and the transceiver 311 are configured to transmit autonomous driving data to the autonomous driving controller 108 on the bus. The AD controller 202 and/or other described components may include one or more SoCs that are provisioned according to the present disclosure.

FIG. 3B is a block diagram illustrating an autonomous driving controller constructed according to a described embodiment. The autonomous driving controller 108 includes general processing circuitry 352, memory 354, and a transceiver 361 coupled to the general processing circuitry 352 and configured to communicate with a plurality of autonomous driving sensors via the bus. The autonomous driving controller 108 also includes an autonomous driving parallel processing system 364 that operates on autonomous driving data received from the autonomous driving sensors and supports autonomous driving operations. The transceiver 361 includes a transmitter 358, a receiver 360, and a media I/F 362 that in combination support communications via the bus. The construct of the general processing circuitry 352 may be similar to the construct of the processing circuitry 302 of the autonomous driving sensor 300. The memory 354 may be of similar structure as the memory 304 of the autonomous driving sensor 300 but with capacity as required to support the functions of the autonomous driving controller 108. The AD parallel processing system 364 and/or the general processing circuitry may include one or more SoCs that are provisioned according to the present disclosure.

FIG. 4A through FIG. 5B describe a parallel processing system that supports autonomous driving. This parallel processing system may include a single SoC or multiple SoCs, one or more of which may be securely provisioned according to one or more embodiments of the present disclosure. The principles and teachings described with reference to FIG. 4A through FIG. 5B may be applied to SoCs of other systems as well, e.g., Financial Services Systems, Medical Processing systems, and air traffic control systems, among other systems.

FIGS. 6A-12 describe structures and operations of an SoC that may be used with any type of system, including an autonomous driving system. The description of FIGS. 6A-12 may refer to autonomous driving systems regarding specialized processing requirements that apply. Of course, the structures and operations described with reference to FIGS. 6A-12 may also apply to other types of systems, including Financial Services Systems, Medical Processing systems, and air traffic control systems, among other systems.

Figure 4A:
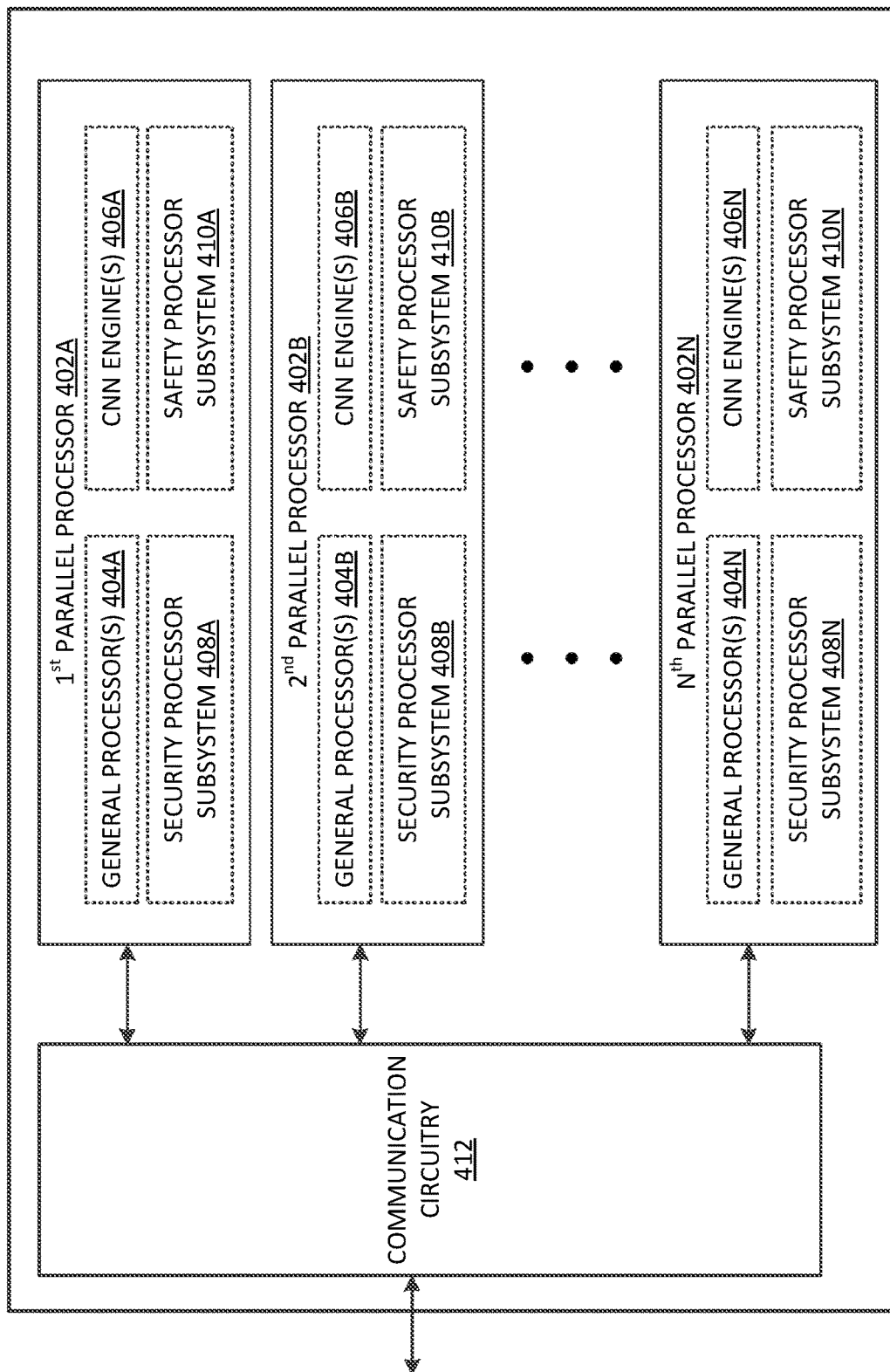
FIG. 4A is a block diagram illustrating a first embodiment of an autonomous driving parallel processing system constructed and operating according to the present disclosure.

FIG. 4A is a block diagram illustrating a first embodiment of an autonomous driving parallel processing system 400 constructed and operating according to the present disclosure. The parallel processing system 400 may be the parallel processing system 364 of FIG. 3B. Alternately, the parallel processing system 400 may be a separate construct that services the autonomous driving needs of a vehicle. The parallel processing system 400 includes a plurality of parallel processors 402A, 402B, . . . , 402N, operating on common input data received from the plurality of autonomous driving sensors 212A-212N. Each of the plurality of parallel processors 402A-402N includes a plurality of components, some of which but not all are illustrated in FIG. 4A. Further components not illustrated in FIG. 4A (and FIG. 4B) may include internal communication circuitry, e.g., Network on a Chip (NoC) communication circuitry, memory controllers, parallel processor General Interface Channel (GIC) circuitry, one or more network interfaces, Read Only Memory (ROM), e.g., system ROM and secure ROM, Random Access Memory (RAM), e.g., general RAM, cache memory RAM, and secure RAM, watchdog timers, and other communication interfaces, for example.

A first parallel processor 402A includes one or more general purpose processors 404A, one or more Convolutional Neural Network (CNN) engines 406A, a Security Processor Subsystem (SCS) 408A, and a Safety Processor Subsystem (SMS) 410A. Likewise, a second parallel processor 402B includes one or more general purpose processors 404B, one or more CNN engines 406B, a SCS 408B, and a SMS 410B. Finally, an Nth parallel processor 402N includes one or more general purpose processors 404N, one or more CNN engines 406N, a SCS 408N, and a SMS 410N.

Generally, the SCSs 408A-408N are responsible for the security of the respective 408N may include authorizing firmware updates, limiting access to memory, authorizing/deauthorizing rights of communication with components external to the plurality of parallel processors 402A-402N, and other security functions. The security operations may be performed as a group to secure the operation of the plurality of parallel processors 402A-402N, i.e., startup operations, validating software/firmware updates, monitoring access of the plurality of parallel processors, etc. The group of SCSs 408A-408N may work together to first independently determine whether to authorize an operation and, second, make a group decision that requires agreement of all SCSs 408A-408N before authorization is given.

The SMSs 410A-410C are responsible for the safety of autonomous driving by the autonomous driving controller. Because the plurality of parallel processors 402A-402N operate substantially on common input data and produce respective outputs, it is the role of the SMSs 410A-410N to determine whether the respective outputs of the parallel processors 402A-402N are in agreement, and if so, whether to authorize initiation or continuation of autonomous driving.

The autonomous driving parallel processing system 364 further includes communication circuitry 412 configured to support communications between the plurality of parallel processors 402A-402N, including communications between the general-purpose processors 404A-404N of the plurality of parallel processors 402A-402N and communications between the SCSs 408A-408N of the plurality of parallel processors 402A-402N that are protected by SCS cryptography. Further, the communication circuitry 412 is further configured to support communications between the SMSs 410A-410N of the plurality of parallel processors 402A-402N protected by SMS cryptography, the SMS cryptography differing from the SCS cryptography. With various aspects of the communication circuitry 412, the communication circuitry 412 may be partially formed in the plurality of parallel processors 402A-402N.

The SCS and the SMS cryptography may be any number of differing cryptographies, e.g., public key cryptography, secret key cryptography, or hash key cryptography, for example. The reader will understand that the principles of the present disclosure may be accomplished using many differing types of cryptography. Because the structure and operation of differing cryptographies is generally known, these structures and operations will not be described further herein except as they relate to the principles and teachings of the present disclosure. The SCS and SMS cryptography (and other cryptography) described herein will be done with reference to public key cryptography in which an SCS private key is used to encrypt communications between the SCSs and in which an SMS private key is used to encrypt communications between the SMSs. Private key cryptography may also be used to protect communications between general purpose processors 404A-404N of the plurality of parallel processors 402A-402N, between components of a vehicle 100A, between vehicles, e.g., between vehicle 100A and 100D, and between a vehicle, e.g., 100A and the autonomous driving server 16.

The SCS private key may be retrieved from a local memory dedicated to the first SCS 408A, e.g., ROM, or from the Resistor Transistor Logic (RTL) of the first SCS 408A. Alternately, the SCS private key may be generated by the first SCS 408A based upon data retrieved from local memory dedicated to the first SCS. Generation of the SCS private key or retrieval of the SCS private key may be performed by dedicated hardware of the first SCS 408A.

Likewise, the SMS private key may be retrieved from a local memory dedicated to the first SMS 410A, e.g., ROM or from the RTL of the first SMS 410A. Alternately, the SMS private key may be generated by the first SMS 410A based upon data retrieved from the local memory dedicated to the first SMS 410A. Generation of the SMS private key or retrieval of the SMS private key may be performed by dedicated hardware of the first SMS 410A.

According to an aspect of the present disclosure, the plurality of parallel processors 402A-402N may be configured such that a second SCS 408B is configured to store a SCS private key received from another SCS 408A in local memory dedicated to the SCS 408A. Likewise, a second SMS 410B may be configured to store a SMS private key received from another SMS 410A in local memory dedicated to the SMS 410B.

According to another aspect of the present disclosure, each of the plurality of parallel processors 402A-402N includes dedicated SCS cryptography hardware corresponding to their SCSs 408A-N. According to still another aspect of the present disclosure, each of the plurality of parallel processors 402A-402N includes dedicated SMS cryptography hardware corresponding to their SMSs 410A-410N.

According to a slightly different aspect, a first parallel processor 402A may include an SCS 408A that includes dedicated SCS memory and/or SCS cryptography hardware. In such case, the SCS 408A retrieves the SCS private key from its dedicated memory or generates the SCS private key and distributes the SCS private key to the other SCSs 408B-408N. In such case, one or more of the other SCSs 408-408N do not have dedicated SCS memory or SCS cryptography hardware. These same aspects may be applied to the SMSs 410A-410N of the plurality of parallel processors 402A-402N.

The autonomous driving parallel processing system 400 may have a number of differing physical constructs. According to one construct, the plurality of parallel processors 402A-402B is formed on a single SoC. With this construct, the communication circuitry 412 may also be formed on the SoC. With another construct, the plurality of parallel processors is formed on differing respective integrated circuits (differing SoCs). Further, with still another construct, a first group of the plurality of parallel processors 402A-402N is formed on a first integrated circuit (first SoC) and a second group of the plurality of parallel processors 402A-402N is formed on a second integrated circuit (second SoC). Of course, other physical constructs may be formed without departing from the scope of the present disclosure. Each of these SoCs may be securely provisioned according to one or more embodiments of the present disclosure.

According to another aspect of the present disclosure, the communication circuitry supports intra-vehicle communications among the plurality of autonomous driving sensors 212A-212N and the autonomous driving controller 202 using intra-vehicle cryptography that differs from the SCS cryptography and the SMS cryptography. Further, according to still another aspect of the present disclosure, wherein the communication circuitry supports extra-vehicle communications using extra-vehicle cryptography that differs from both the intra-vehicle cryptography and the SCS cryptography and the SMS cryptography.

Figure 4B:
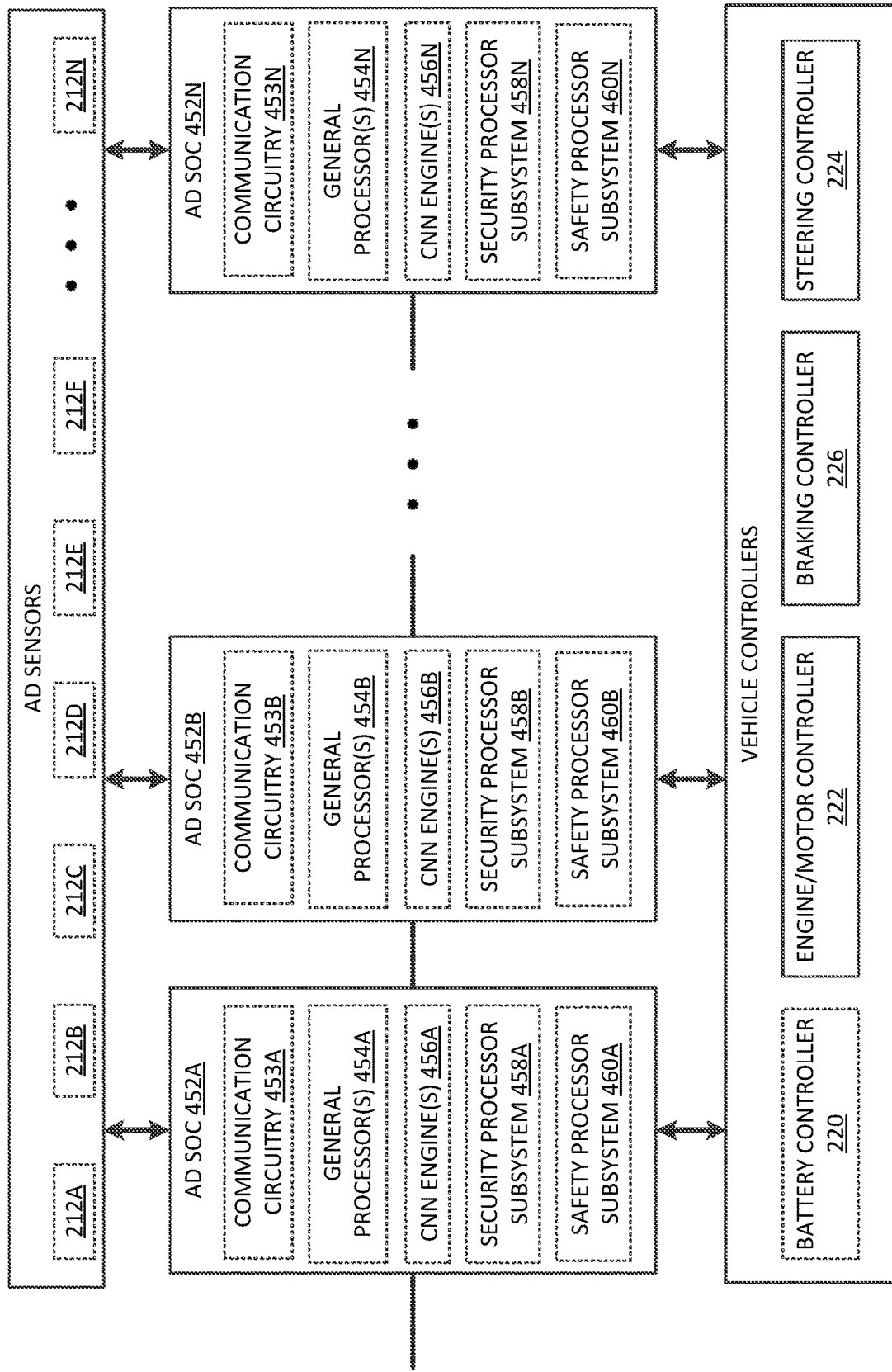
FIG. 4B is a block diagram illustrating a second embodiment of an autonomous driving parallel processing system constructed and operating according to the present disclosure.

FIG. 4B is a block diagram illustrating a second embodiment of an autonomous driving parallel processing system 450 constructed and operating according to the present disclosure. The autonomous driving parallel processing system 450 may be the autonomous driving parallel processing system 364 of FIG. 3B or may be a separate construct. As contrasted to the structure of FIG. 4A, the autonomous driving parallel processing system 450 of FIG. 4B includes a SoC for each parallel processor 452A-452N. Further, the communication circuitry 453A-453N resides, respectively, in the plurality of parallel processors 452A-452N. The parallel processing system may service all autonomous driving needs of a vehicle.

The parallel processing system 450 includes a plurality of parallel processors 452A, 452B, . . . , 452N, operating on common input data received from the plurality of autonomous driving sensors 212A-212N. The parallel processing system 450 also provides output data to vehicle controllers 220, 222, 226, and 224. This output data may be provided by agreement among the plurality of parallel processors 452A-452N or by a designated parallel processor of the plurality of parallel processors 452A-452N.

Each of the plurality of parallel processors 452A-452N may include components not illustrated in FIG. 4A and which may include internal communication circuitry, e.g., Network on a Chip (NoC) communication circuitry, memory controllers, parallel processor General Interface Channel (GIC) circuitry, one or more network interfaces, Read Only Memory (ROM), e.g., system ROM and secure ROM, Random Access Memory (RAM), e.g., general RAM, cache memory RAM, and secure RAM, watchdog timers, and other communication interfaces, for example.

A first parallel processor 452A includes communication circuitry 453A, one or more general purpose processors 454A, one or more CNN engines 456A, a SCS 458A, and a SMS 460A. Likewise, a second parallel processor 452B includes communication circuitry 453B, one or more general purpose processors 454B, one or more CNN engines 456B, a SCS 458B, and a SMS 460B. Finally, an Nth parallel processor 452N includes communication circuitry 453N, one or more general purpose processors 454N, one or more CNN engines 456N, a SCS 458N, and a SMS 460N.

The communication circuitry 453A-453N is configured to support communications between the plurality of parallel processors 452A-452N, including communications between the general-purpose processors 454A-454N of the plurality of parallel processors 452A-452N and communications between the SCSs 458A-458N of the plurality of parallel processors 452A-452N that are protected by SCS cryptography. Further, the communication circuitry 453A-453N is further configured to support communications between the SMSs 460A-460N of the plurality of parallel processors 452A-452N protected by SMS cryptography, the SMS cryptography differing from the SCS cryptography. According to another aspect, additional communication circuitry components may be included external to the plurality of parallel processors 452A-452N.

The SCS and the SMS cryptography of the parallel processing system 450 of FIG. 4B may be same similar as the SCS and SMS cryptography described with reference to FIG. 4A. Further, the particular structures and operations of the SCS and SMS of the parallel processing system 450 of FIG. 4B may be same or similar to those of FIG. 4A. Moreover, public key cryptography may also be used to protect communications between general purpose processors 454A-454N of the plurality of parallel processors 452A-452N, between components of a vehicle 100A, between vehicles, e.g., between vehicle 100A and 100D, and between a vehicle, e.g., 100A and the autonomous driving server 16.

Figure 5A:
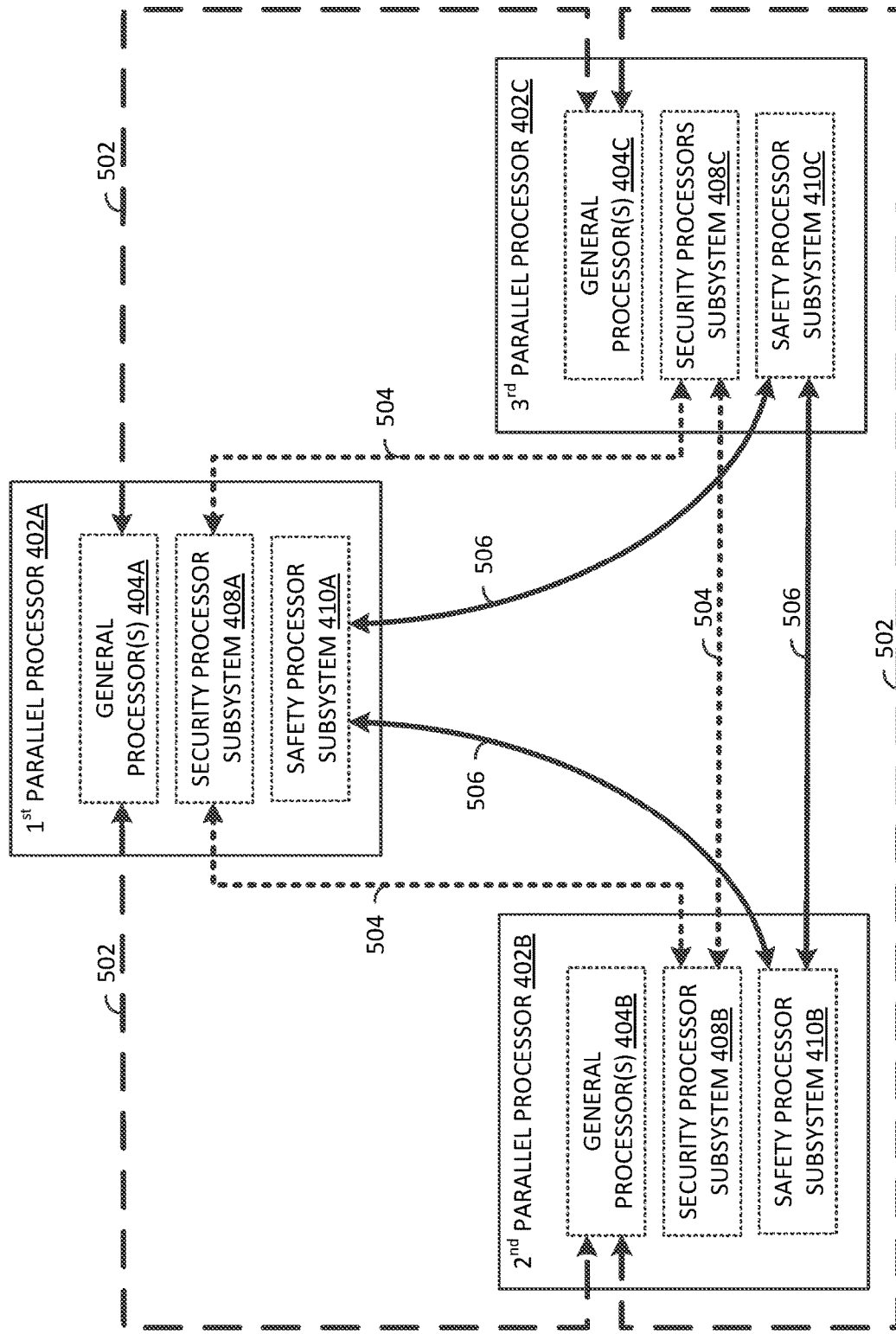
FIG. 5A is a block diagram illustrating communications among components of the autonomous driving parallel processors of FIGS. 4A and/or 4B.

FIG. 5A is a block diagram illustrating communications among components of the autonomous driving parallel processors of FIGS. 4A and/or 4B (400 and 450). Shown are three parallel processors 402A, 402B, and 402C that service communications among their general-purpose processors 404A-404C, among their SCSs 408A-408C, and among their SMSs 410A-410C in differing manners. From one viewpoint, different roots of trust are established between differing sets of components. A first root of trust is established among the general-purpose processors 404A, 404B, and 404C of the parallel processors 402A, 402B, and 402C. This root of trust among the general-purpose processors 404A, 404B, and 404C may be established so that communications therebetween are not encrypted. Alternately, the root of trust among the general-purpose processors 404A, 404B, and 404C may be established on a vehicle wide basis such that a shared public key/private key pair is used by all components within the vehicle to protect intra-vehicle communications, e.g., between the general-purpose processors 404A, 404B, and 404C and the autonomous driving sensors 212A-212N. The first root of trust is then used to support general processor communications 502 between the general-purpose processors 404A, 404B, and 404C.

Further, another root of trust is established among the SCSs 408A, 408B, and 408C that uses an SCS public/private key pair. The SCS private key (and SCS public key) may be hard wired, e.g., ROM or RTL, in one of the SCSs 408A, 408B, or 408C. The SCS private key is then distributed among the other SCSs 408B and 408C of the parallel processing system, which is subsequently used for all SCS communications 504 between the SCSs 408A-408C.

Additionally, another root of trust is established among the SMSs 410A, 410B, and 410C that uses an SMS public/private key pair that is different from the SCS public/private key pair. The SMS private key (and SMS public key) may be hard wired, e.g., ROM or RTL, in one of the SMSs 410A, 410B, or 410C. The SMS private key is then distributed among the other SMSs 410B and 410C of the parallel processing system, which is subsequently used for all SMS communications 506 between the SMSs 410A-410C.

The same or differing encryption types may be used for the differing roots of trust. For example, a weak encryption may be used for the general processor communications 502 with stronger encryption used for the SCS communications 504 and the SMS communications 506. Further, with some aspects, a strongest encryption is used for the SCS communications 504 because the SCSs are the most secure components of the parallel processing system.

Figure 5B:
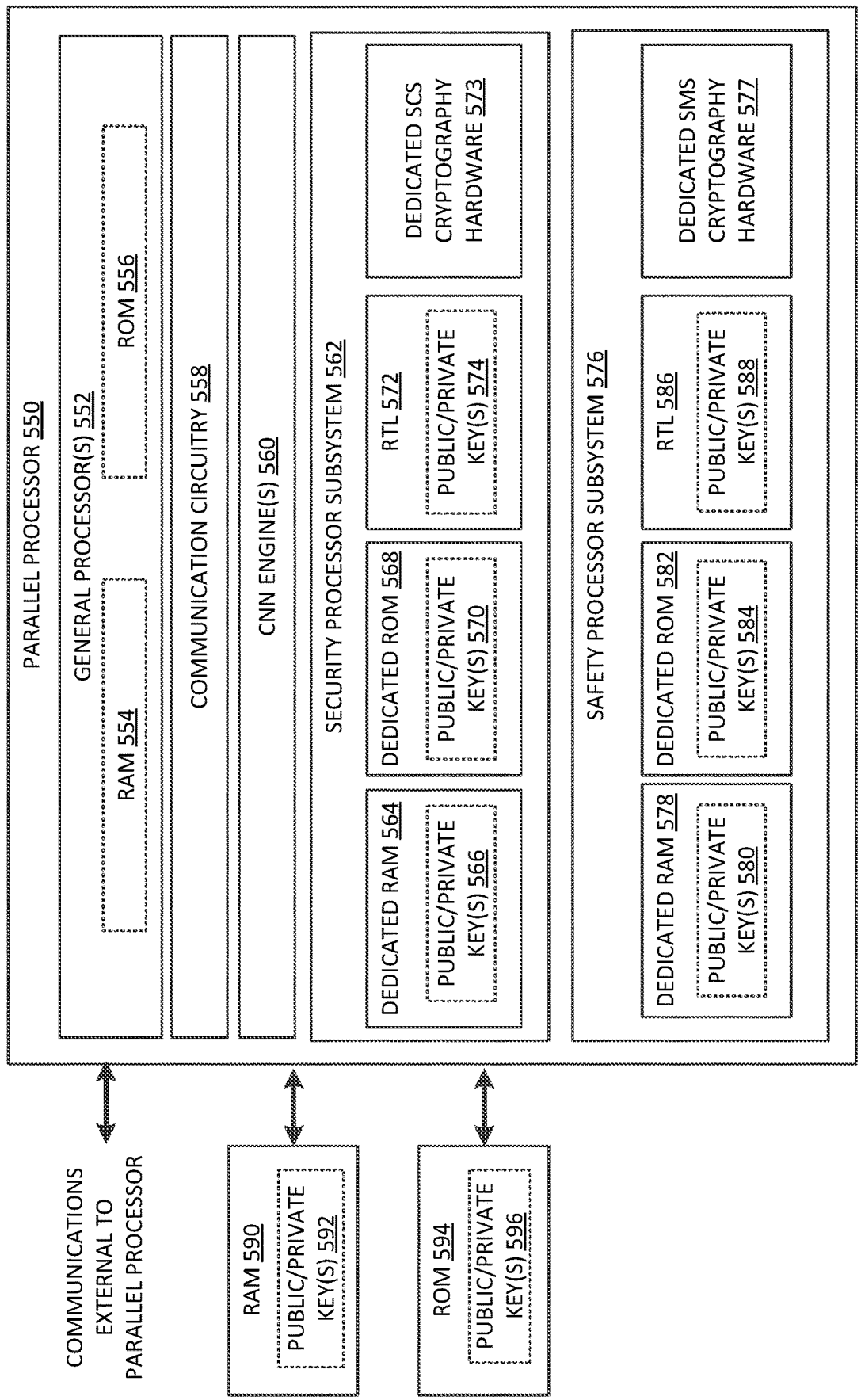
FIG. 5B is a block diagram illustrating components of a parallel processor of the autonomous driving parallel processors of FIGS. 4A and/or 4B according to one or more aspects of the described embodiments.

FIG. 5B is a block diagram illustrating components of a parallel processor of the autonomous driving parallel processors of FIGS. 4A and/or 4B according to one or more aspects of the described embodiments. A parallel processor 550 includes one or more general purpose processors 552, communication circuitry 558, one or more CNN engines 560, a SCS 562, and a SMS 576. The general-purpose processors include local RAM 554 and local ROM 556. The communication circuitry 558 is configured to support communications between the parallel processor 550 and other parallel processors and between the parallel processor 550 and other components external to the parallel processor 550. RAM 590 services the parallel processor 550 and stores data that may include public/private keys 592. The ROM 594 services the parallel processor 550 and stores data that may include public/private keys 596.

The parallel processor 550 further includes CNN engine(s) 506, a SCS 562 and a SMS 576. The SCS 562 includes dedicated RAM 564 that may be used to store public/private keys 566. Further, the SCS 562 further includes dedicated ROM 568 and RTL 572 that may store public/private keys 570 and 574, respectively. The SCS 562 may further include dedicated SCS cryptography hardware 573 that supports the SCS cryptography operations according to the present disclosure, and which may include key generation, communication encryption, and communication decryption operations.

Likewise, the SMS 576 further includes dedicated RAM 578 that may be used to store public/private keys 580. Further, the SMS 576 further includes dedicated ROM 582 and RTL 586 that may store public/private keys 584 and 588, respectively. The RTL 572 and 586 are hard programmed during manufacture of the parallel processor 550 and the ROM 568 and 582 may be programmed during provisioning of the parallel processor 550. The SMS 576 may further include dedicated SMS cryptography hardware 577 that supports the SMS cryptography operations according to the present disclosure, and which may include key generation, communication encryption, and communication decryption operations.

The parallel processor 550 supports SCS and the SMS cryptography that may be same/similar as the SCS and SMS cryptography described with reference to FIGS. 4A, 4B and 5A. Further, the parallel processor 550 also supports general processor 552 communications as were previously described herein with reference to other structure(s).

FIGS. 4A-5B describe the use of cryptography to protect communications within a SoC, communications within a system between SoCs, communications within the system, and/or communications external to the system. FIGS. 6A-12 described structure and methods of operation thereof to isolate communications between differing components of a SoC or multiple SoCs. The teachings of FIGS. 6A-12 may be embodied separately and apart from the teachings of FIGS. 4A-5B in some systems. However, the teachings of FIGS. 6A-12 may be combined with the teachings of FIGS. 4A-5B in other systems.

Figure 6A:
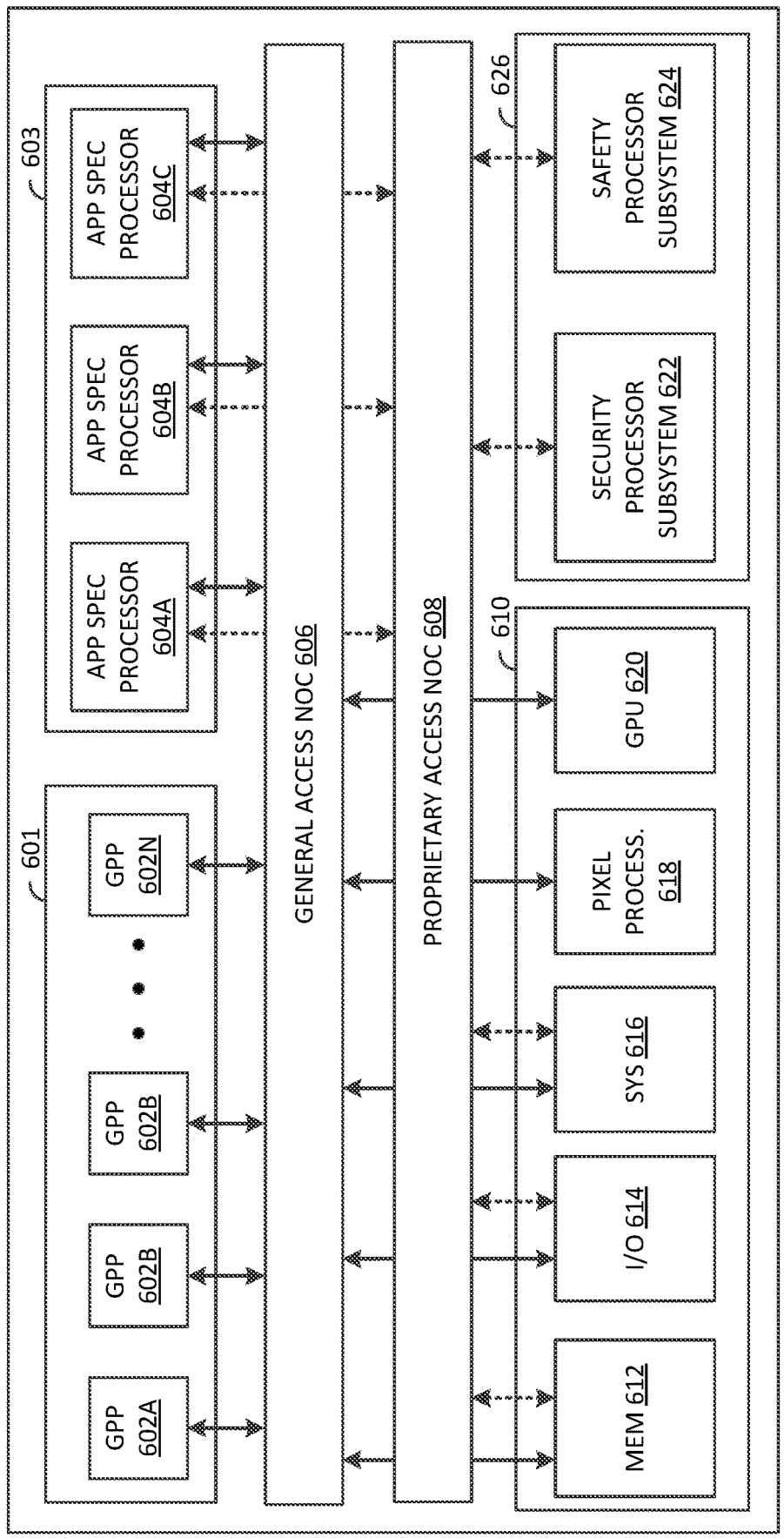
FIG. 6A is a block diagram illustrating a SoC having both a general access Network on a Chip (NoC) and a proprietary access NoC according to one or more described embodiments.

FIG. 6A is a block diagram illustrating a SoC having both a general access Network on a Chip (NoC) and a proprietary access NoC according to one or more described embodiments. The SoC 600 of FIG. 6A includes a plurality of general purpose processors (GPPs) 601 including GPPs 602A, 602B, 602C, through 602N. The plurality of general purposes processors 601 may have identical or substantially identical structure and perform general processing tasks for the SoC 600. The SoC further includes a plurality of application specific processors (ASPs) 603 including ASPs 604A, 604B, and 604C. In other embodiments there may be a fewer number or a greater number of ASPs 603. In an autonomous driving application, the ASPs 603 may be CNN engines. In other applications, the ASPs 603 may be specific to financial services processing, medial systems processing, or air traffic control processing, among other processing functions.

The SoC 600 further includes a plurality of SoC support processing components 610, which may include a memory subsystem 612, an input/output (I/O) interface 614, system utility components 616, pixel processing components 618, and/or a graphic processing unit (GPU) 620, among other components. The SoC 600 further includes a SCS 622, which has been described previously herein in detail. The SoC 600 further includes an SMS 624, which has also been previously described herein in detail. As indicated, the SCS 622 and the SMS 624 may be combined into a single processing structure SCS/SMS 626.

The SoC 600 further includes a general access Network on a Chip (NoC) 606 coupled to and servicing communications between the plurality of general purpose processors 601 and the plurality of SoC support components 610. Finally, the SoC 600 further includes a proprietary access NoC 608 coupled to and servicing communications for the plurality of ASPs 603, the SCS 622 and the SMS 624.

Generally, the general purpose NoC 606 and the proprietary access NoC 608 are separate components, isolated from one another structurally and functionally, and service differing intra-SoC (and extra-SoC) communications. According to one aspect of the SoC 600 of FIG. 6A, proprietary communications between the SCS 622 (and/or SMS 624) and the plurality of ASPs 603, the memory subsystem 612, the I/O interface 614, and the system utility components 616 are serviced only by the proprietary access NoC 608. Thus, the SCS 622 (and/or the SMS 624) are communicatively isolated from the plurality of GPPs 601 to preclude malicious access of the SCS 622 and/or the SMS 624 by the plurality of GPPs 601. According to another aspect of the SoC 600 of FIG. 6A, the general access NoC 606 and the proprietary access NoC 608 isolate communications of the plurality of ASPs 603 from communications of the plurality of GPPs 601.

Isolation of communications by the general purpose NoC 606 and the proprietary access NoC may be accomplished in differing manners. According to one manner, the isolation of communications is accomplished by complete physical isolation of the proprietary communications serviced by the proprietary access NoC 608 from general communications service by the general access NoC 606. In such case, the general purpose NoC 606 and the proprietary access NoC 608 are physically distinct from another. As shown in FIG. 6A, the plurality of ASPs 603, the memory subsystem 612, the I/O interface 614, and the system utility components 616 may also couple to the general access NoC 606. In such case, there are separate communication paths from these devices to the general access NoC 606 and to the proprietary access NoC 608. This structure provides structural isolation which would be difficult to bypass/overcome.

Figure 6B:
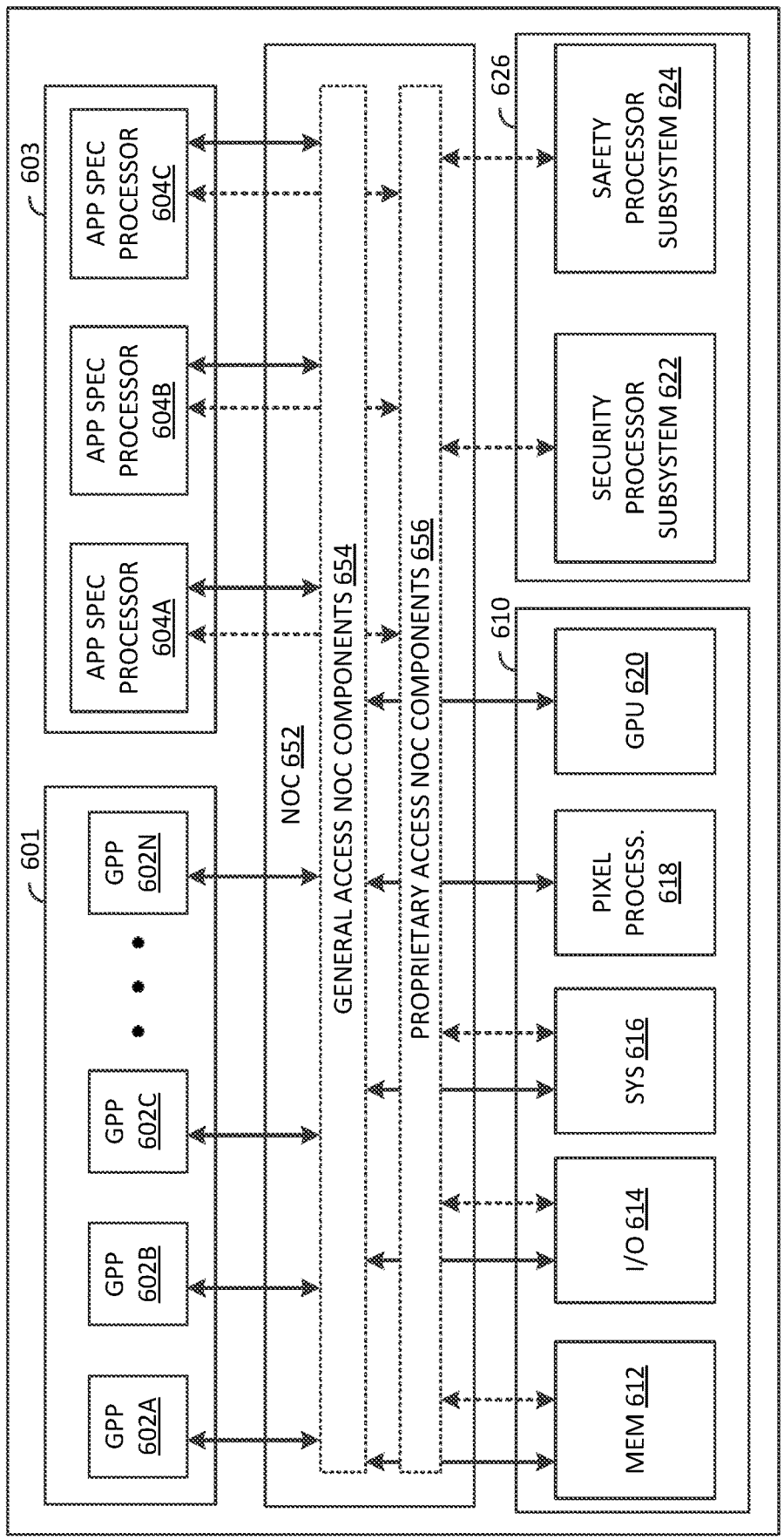
FIG. 6B is a block diagram illustrating a SoC having NoC with both general access NoC components and proprietary access NoC components according to one or more described embodiments.

FIG. 6B is a block diagram illustrating a SoC having NoC with both general access NoC components and proprietary access NoC components according to one or more described embodiments. The SoC 650 of FIG. 6B is similar to the SoC of FIG. 6A and common components retain common numbering and will be described again with reference to FIG. 6B. As compared to the SoC 600 of FIG. 6A, the SoC 650 of FIG. 6B includes a single NoC 652 having both general access NoC components 654 and proprietary access NoC components 656. The NoC components 654 and 656 provide isolation for the other components of the SoC 650 as was previously described with reference to FIG. 6A. However, with the structure of FIG. 6B, some components of the NoC 652 may be shared by and between the general access NoC components 654 and the proprietary access NoC components 656. The sharing of components, however, does not affect the isolation of general versus proprietary communications serviced by the NoC 652.

Figure 6C:
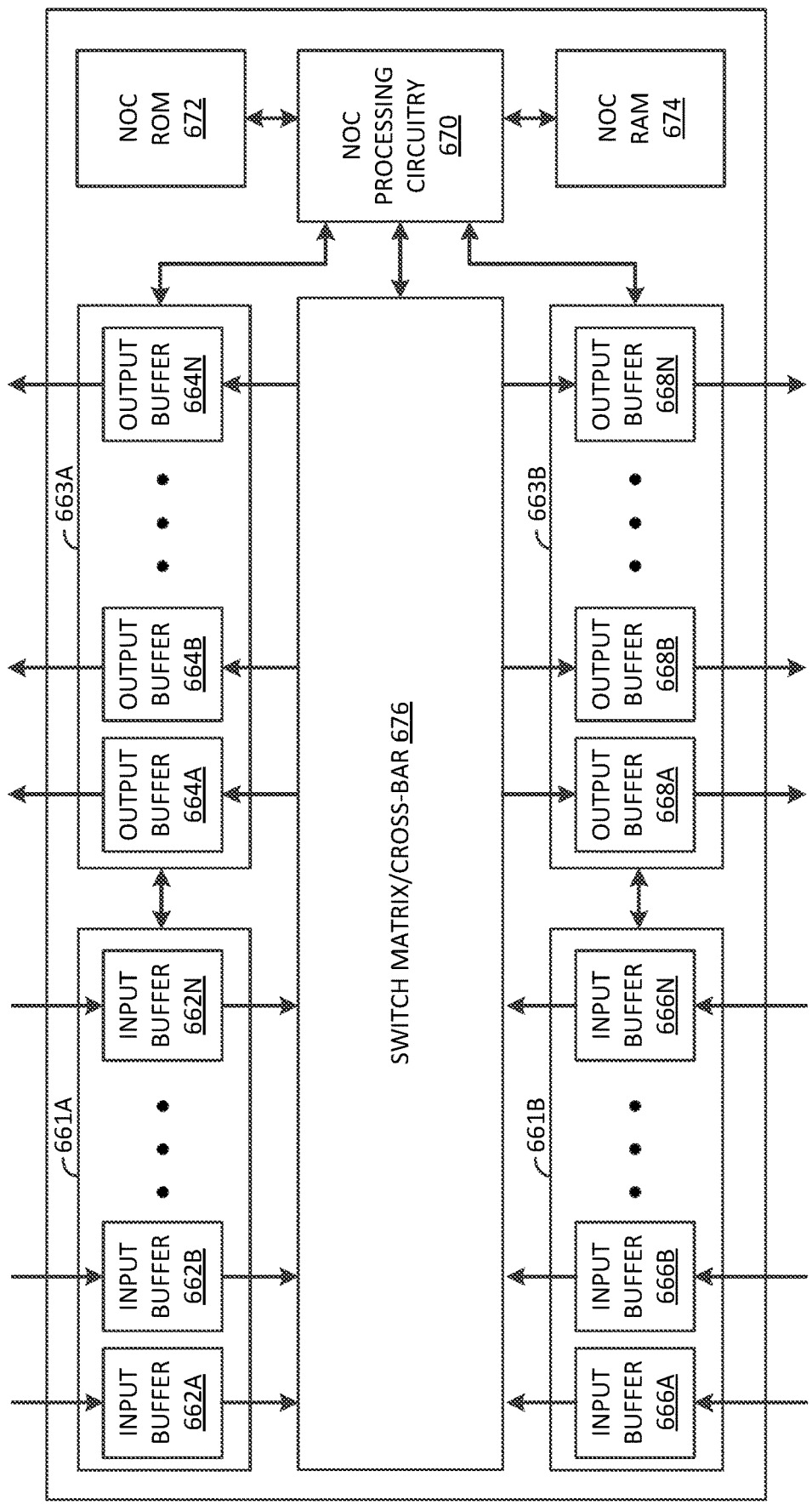
FIG. 6C is a block diagram illustrating a NoC according to one or more described embodiments.

FIG. 6C is a block diagram illustrating a NoC according to one or more described embodiments. The NoC 660 illustrated in FIG. 6C may be either the general access NoC 606 or the proprietary access NoC 608 of FIG. 6A or the NoCs illustrated in subsequent FIGs. The NoC 660 includes a first plurality of input buffers 661A, a second plurality of input buffers 661B, a first plurality of output buffers 663A, a second plurality of output buffers 663B, a switch matrix/ cross-bar 676, NoC processing circuitry 670, NoC ROM 672, and NoC RAM 674. The first plurality of input buffers 661A includes input buffers 662A, 662B, . . . , 662N. The second plurality of input buffers 661B includes input buffers 666A, 666B, . . . , 666N. The first plurality of out buffers 663A includes output buffers 664A, 664B, . . . , 664N. The second plurality of output buffers 663B includes output buffers 668A, 668B, . . . , 668N. The NoC processing circuitry 670 couples to the input buffers 661A and 661B, to the output buffers 663A and 663B, to the NoC ROM 672, and to the NoC RANI 674. The NoC processing circuitry 670 controls the operation of the NoC 660, including control of the input buffers 661A and 661B, the output buffers 663A and 663B, and the switch matrix/cross-bar 676. Such control may include protecting the NoC from malicious attack that would affect its programming.

The NoC ROM 672 includes NoC boot code that is used to boot or re-boot the NoC 660. The NoC ROM 672 may be programmed with the NoC boot code during manufacture to ensure that it may not be later corrupted. Alternately, the NoC boot code may be permanently written to the NoC ROM 672 upon provisioning.

Figure 7:
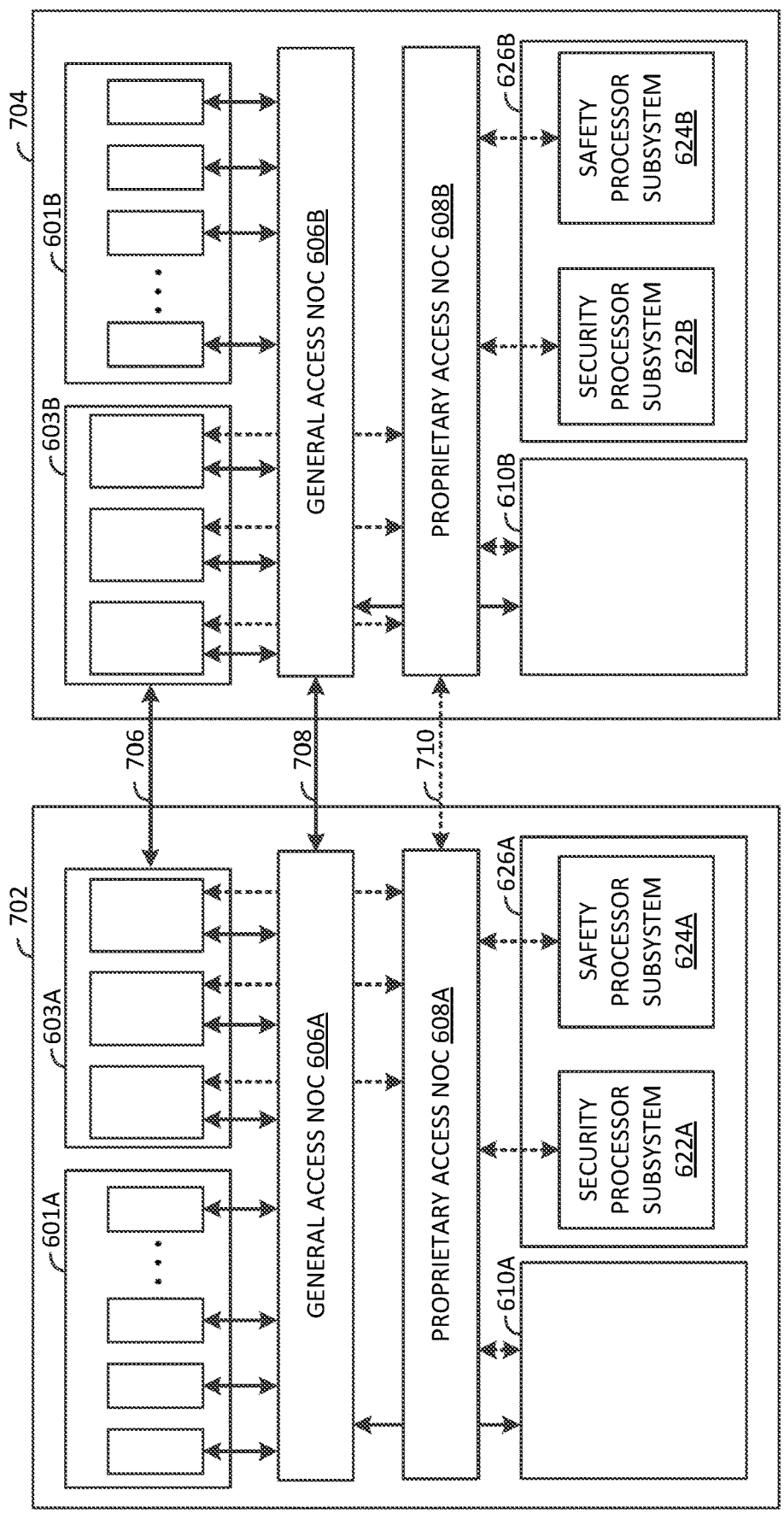
FIG. 7 is a block diagram illustrating two interconnected SoCs each having both a general access NoC and a proprietary access NoC according to one or more described embodiments.

FIG. 7 is a block diagram illustrating two interconnected SoCs each having both a general access NoC and a proprietary access NoC according to one or more described embodiments. The two interconnected SoCs 700 includes SoC 702 and SoC 704. With the embodiment of FIG. 7, the SoCs 702 and 704 reside on separate dies. They may operate in parallel as previously described in an autonomous driving system or another type of system in which availability and consistency is valuable. In other embodiments, more than two SoCs may be interconnected to meet these goals.

SoC 702 interconnects with SoC 704 via multiple interconnections. These interconnections include communication coupling 706 between ASPs 603A and ASPs 603B. Communication coupling 706 may be employed to ensure that the ASPs 603A and 603B may compare their processing, e.g., input data and/or output data to guarantee that an error state does not exist and/or to remedy the error state. Communication coupling 708 supports communications between general access NoC 606A and general access NoC 606B for inter-SoC general communications. Communication coupling 710 supports communications between proprietary access NoC 608A and proprietary access NoC 608B for inter-SoC proprietary communications.

Figure 8:
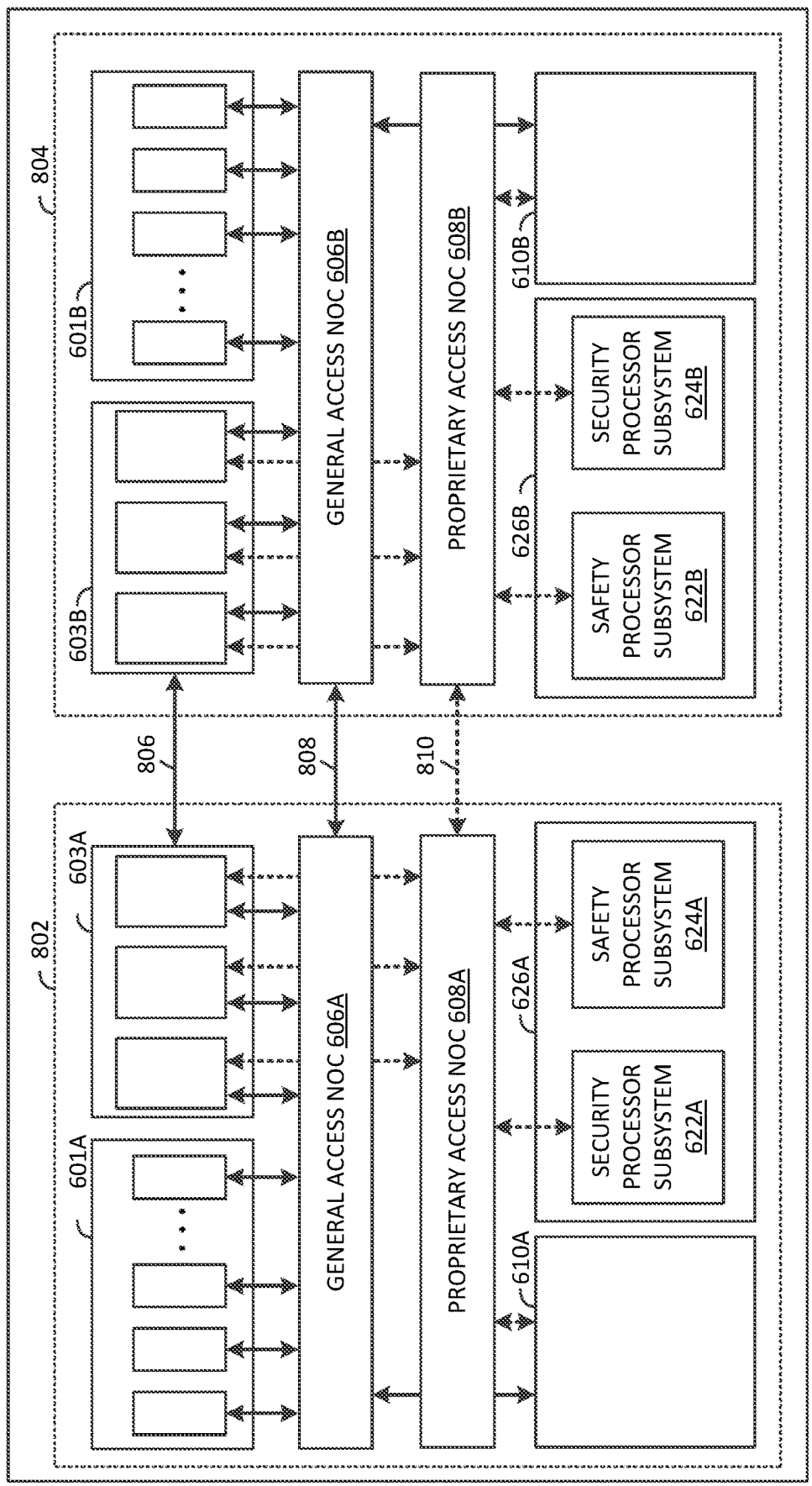
FIG. 8 is a block diagram illustrating a SoC having multiple general access NoCs and multiple proprietary access NoCs according to one or more described embodiments.

FIG. 8 is a block diagram illustrating a SoC having multiple general access NoCs and multiple proprietary access NoCs according to one or more described embodiments. The interconnected SoCs 802 and SoC 804 are formed on a single die. The structure and operation of the SoCs 802 and 804 may be similar to that previously described with reference to FIGS. 6A-7.

With the structure of FIG. 8, SoC 802 interconnects with SoC 804. Interconnections include communication coupling 806 between ASPs 603A and ASPs 603B. This communication coupling 806 may be employed to ensure that the ASPs 603A and 603B may compare their processing, e.g., input data and/or output data to guarantee that an error state does not exist and/or to remedy the error state. Communication coupling 808 supports communications between general access NoC 606A and general access NoC 606B for inter-SoC general communications. Communication coupling 810 supports communications between proprietary access NoC 608A and proprietary access NoC 608B for inter-SoC proprietary communications.

Figure 9:
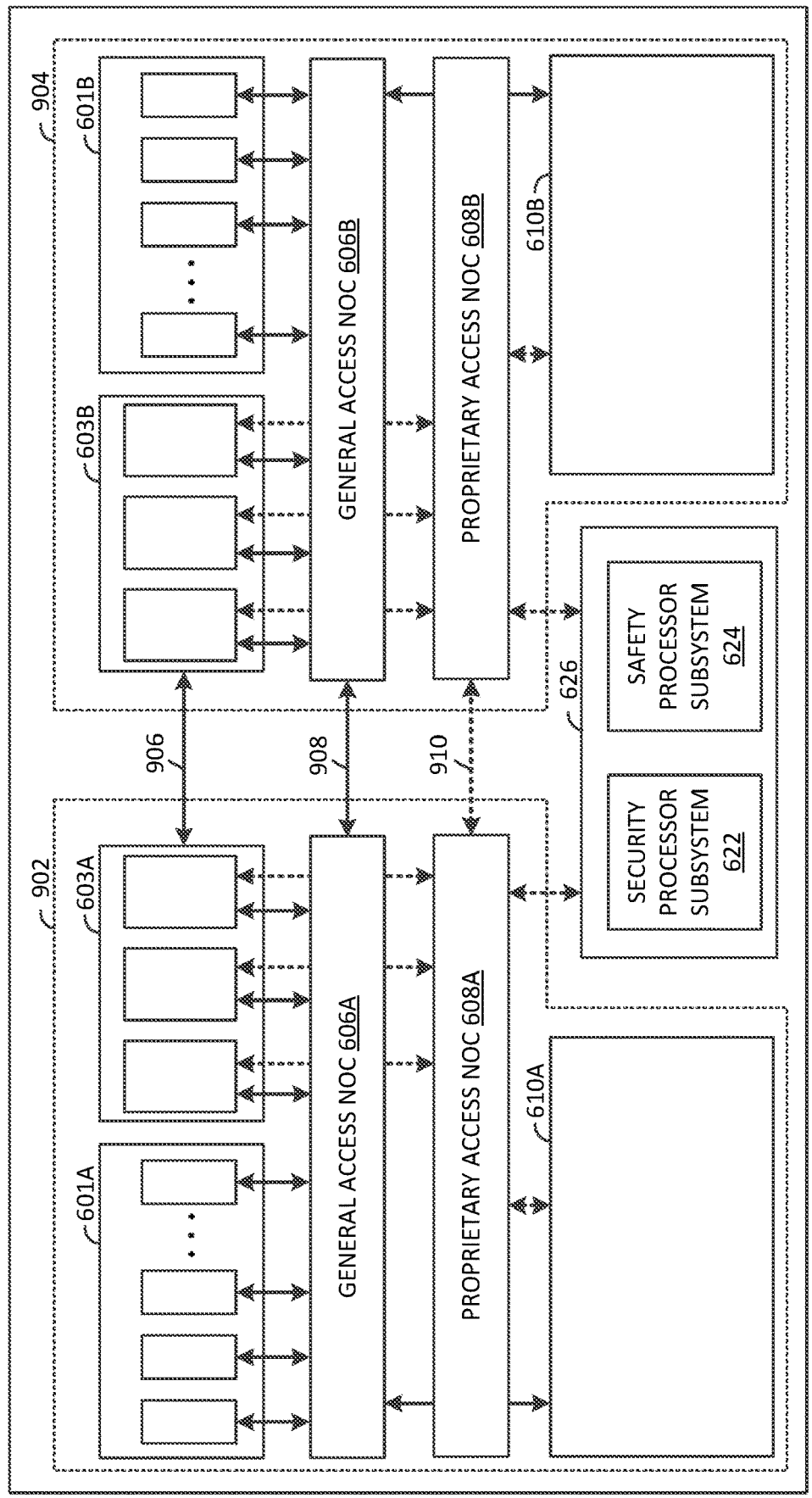
FIG. 9 is a block diagram illustrating a SoC having multiple general access NoCs and multiple proprietary access NoCs according to one or more described embodiments.

FIG. 9 is a block diagram illustrating a SoC having multiple general access NoCs and multiple proprietary access NoCs according to one or more described embodiments. The SoC 900 of FIG. 9 is similar to the structure of FIG. 8. However, the SoC 900 of FIG. 9 includes a single SCS/SMS 626, which has a SCS 622 and a SMS 624 but not a second SCS/SMS. The SoC 900 of FIG. 9 includes two separate SoC portions 902 and 904 that have components same/similar to those that were previously described herein.

SoC portions 902 and 904 interconnect with one another via multiple interconnections. These interconnections include communication coupling 906 between ASPs 603A and ASPs 603B. This communication coupling 906 may be employed to ensure that the ASPs 603A and 603B may compare their processing, e.g., input data and/or output data to guarantee that an error state does not exist and/or to remedy the error state. Communication coupling 908 supports communications between general access NoC 606A and general access NoC 606B for inter-SoC portions general communications. Communication coupling 910 supports communications between proprietary access NoC 608A and proprietary access NoC 608B for inter-SoC portions proprietary communications.

Figure 10:
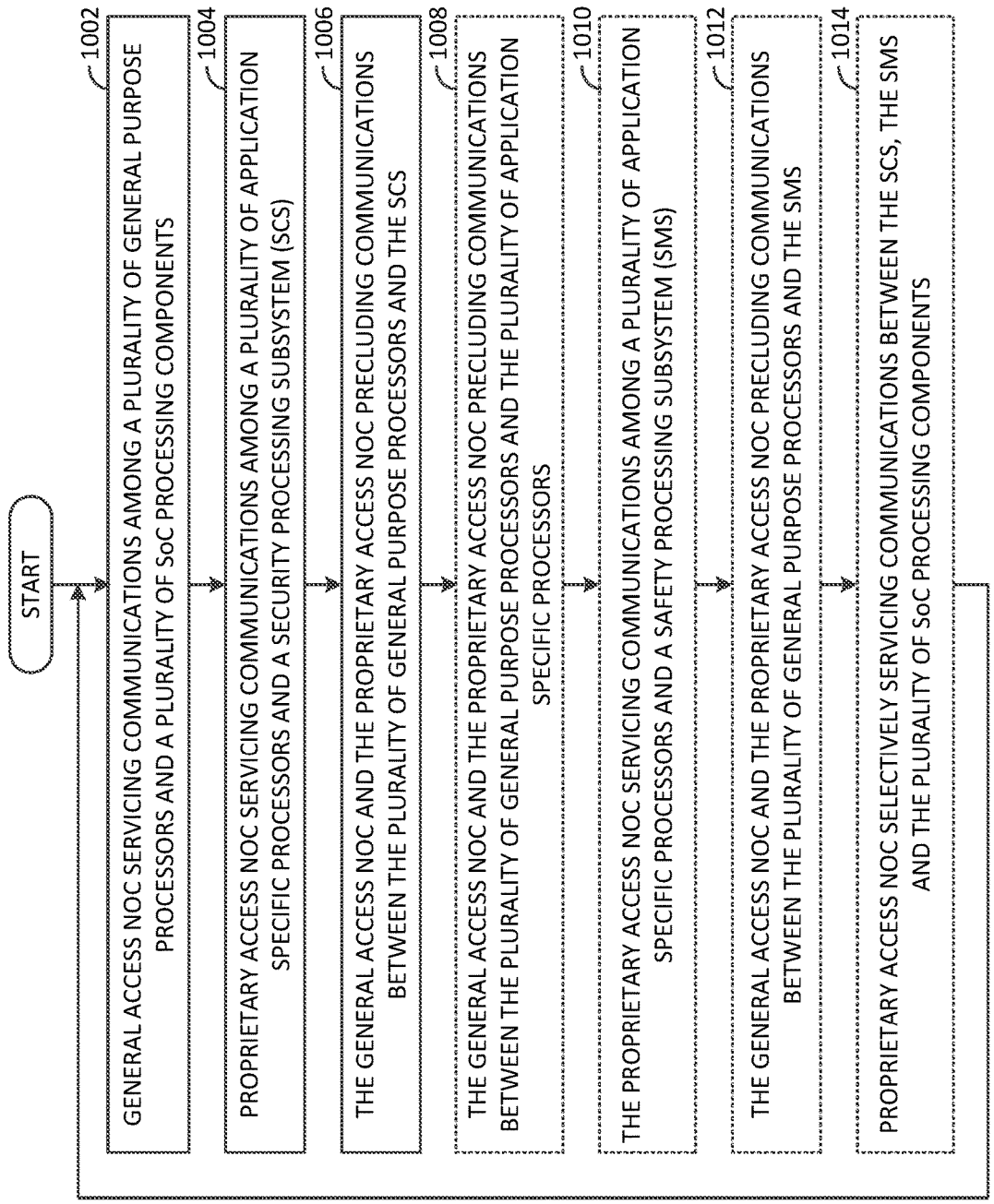
FIG. 10 is a flow diagram illustrating operations of an SoC according to a described embodiment.

FIG. 10 is a flow diagram illustrating operations of an SoC according to a described embodiment. Operations 1000 of FIG. 10 begin with a general access NoC servicing communications among a plurality of general purpose processors and a plurality of SoC support processing components (step 1002). Operations 1000 continue with a proprietary access NoC servicing communications among a plurality of application specific processors and a SCS (step 1004). Operations 1000 then include the general access NoC and the proprietary access NoC precluding communications between the plurality of general purpose processors and the SCS (step 1006).

The operations 1000 of FIG. 10 include, optionally, the general access NoC and the proprietary access NoC precluding communications between the plurality of general purpose processors and the plurality of application specific processors (step 1008). Another additional operation includes the proprietary access NoC servicing communications among the plurality of application specific processors, the SCS, and a SMS (step 1010). Step 1010 is followed by the additional operation of the general access NoC and the proprietary access NoC precluding communications between the plurality of general purpose processors and the SMS (step 1012). With a final optional operation, the proprietary access NoC selectively servicing communications between a memory interface and an I/O interface of the plurality of SoC support processing components, the plurality of application specific processors, the SCS, and the SMS. The method of claim 14, further comprising the proprietary access NoC selectively servicing communications between a memory interface and an I/O interface of the plurality of SoC support processing components, the plurality of application specific processors, and the SCS.

Figure 11:
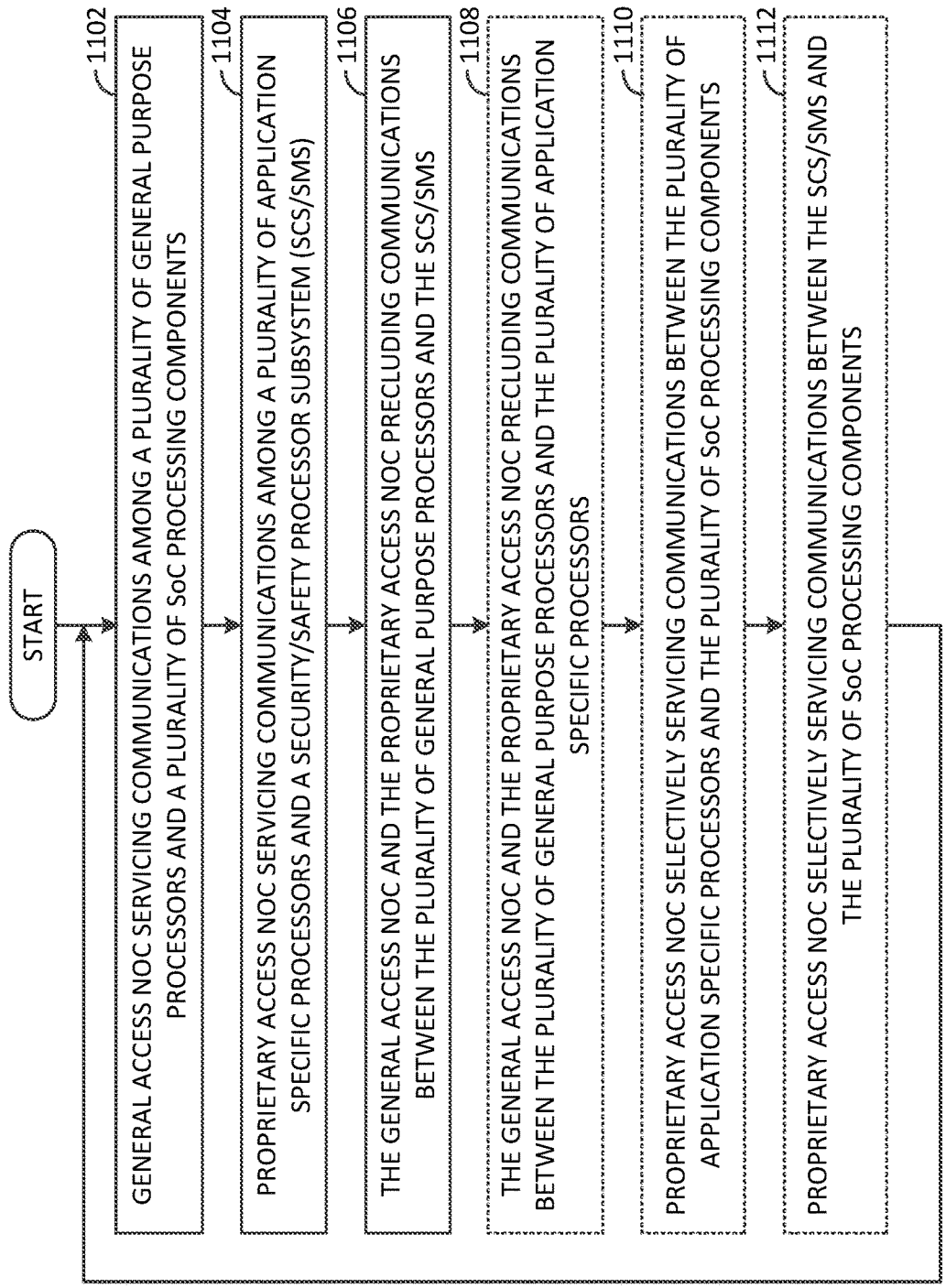
FIG. 11 is a flow diagram illustrating operations of an SoC according to a described embodiment.

FIG. 11 is a flow diagram illustrating operations of an SoC according to a described embodiment. Operations 1100 of FIG. 11 begin with a general access NoC servicing communications among a plurality of general purpose processors and a plurality of SoC support processing components (step 1102). Operations 1100 continue with a proprietary access NoC servicing communications among a plurality of application specific processors and a SCS/SMS (step 1104). Operations 1100 then include the general access NoC and the proprietary access NoC precluding communications between the plurality of general purpose processors and the SCS/SMS (step 1106).

The operations 1100 of FIG. 11 include, optionally, the general access NoC and the proprietary access NoC precluding communications between the plurality of general purpose processors and the plurality of application specific processors (step 1108). Another additional operation includes the proprietary access NoC servicing communications among the plurality of application specific processors and the plurality of SoC processing components (step 1110). Step 1110 is followed by the additional operation of the general access NoC and the proprietary access NoC precluding communications between the plurality of general purpose processors and the SCS/SMS (step 1112). The proprietary access NoC may also selectively service communications between a memory interface and an I/O interface of the plurality of SoC support processing components, the plurality of application specific processors, the SCS, and the SMS. The proprietary access NoC may also selectively service communications between a memory interface and an I/O interface of the plurality of SoC support processing components, the plurality of application specific processors, and the SCS.

Figure 12:
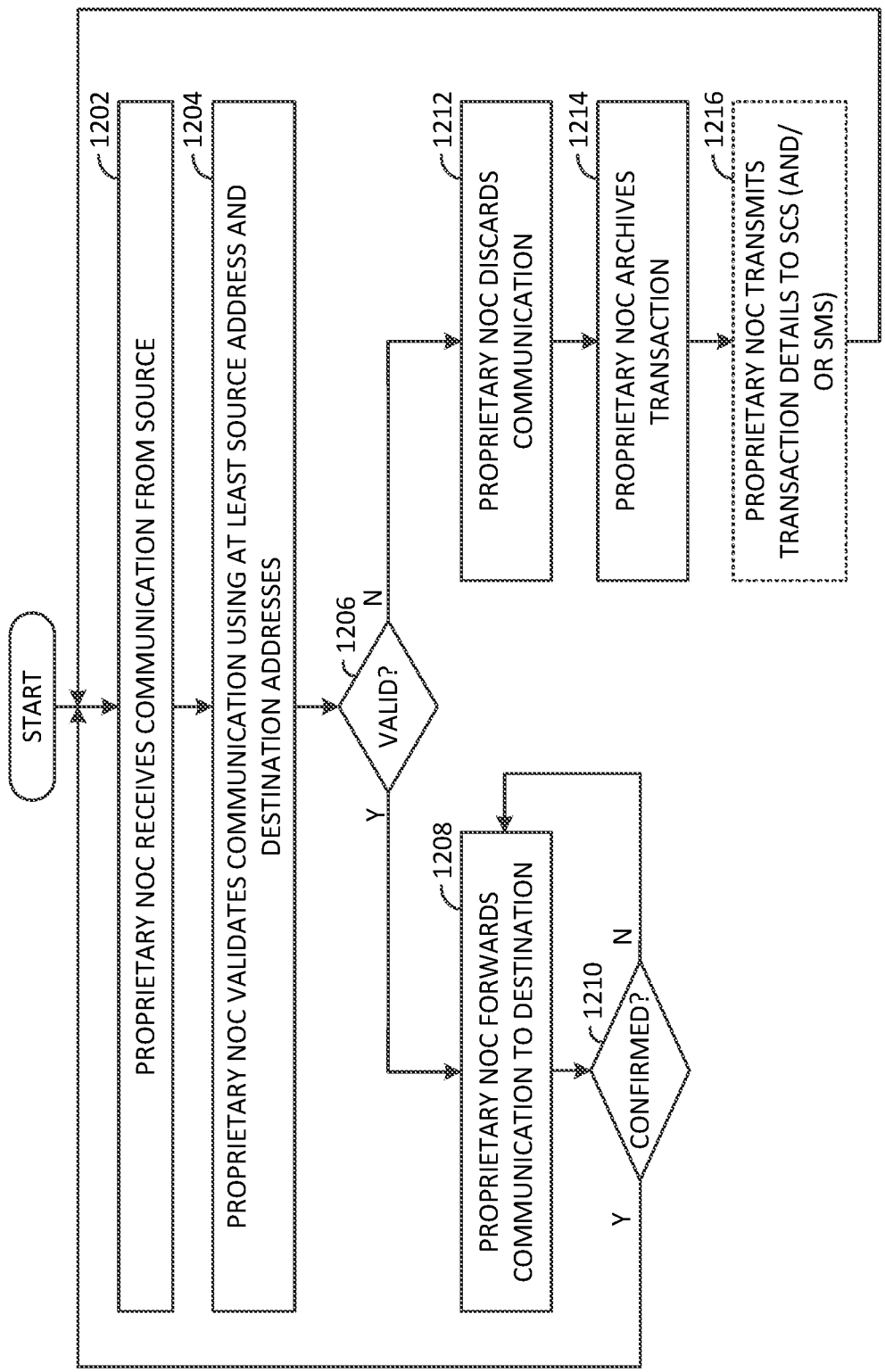
FIG. 12 is a flow diagram illustrating operation of a NoC according to a described embodiment.

FIG. 12 is a flow diagram illustrating operation of a NoC according to a described embodiment. Operations 1200 begin with the proprietary NoC receiving a communication from a source, e.g., an APS, e.g., 604A, the memory subsystem 612, the I/O interface 614, the system utility components 616, the SCS 622, or the SMS 624, for example (step 1202). Operations 1200 continue with the proprietary NoC validating the communication using at least a source address and/or a destination address of the communication (step 1204). This communication may be further protected by encryption as previously described herein. In such case, the NoC may have an encryption key that it uses to validate the communication.

Operations 1200 continue with the proprietary NoC validating the communication (decision step 1206). If the communication is valid, as determined at step 1206, the proprietary NoC forwards the communication to a destination (step 1208). The proprietary NoC may use a confirmation protocol with the destination to determine whether the communication was successfully received at the destination (step 1210). If confirmed, operations 1200 proceed to step 1202. If not confirmed, operations 1200 return to step 1208.

If the communication was not validated at step 1206, operations 1200 then include the proprietary NoC discarding the communication (1212), archiving details of the invalid communication (step 1214), and optionally transmitting transaction details to the SCS (and/or the SMS) (step 1216). From step 1216, operation returns to step 1202.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed system, method, and computer program product. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure.

Routines, methods, steps, operations, or portions thereof described herein may be implemented through electronics, e.g., one or more processors, using software and firmware instructions. A "processor" or "processing circuitry" includes any hardware system, hardware mechanism or hardware component that processes data, signals or other information. A processor can include a system with a central processing unit, multiple processing units, dedicated circuitry for achieving functionality, or other systems. Some embodiments may be implemented by using software programming or code in one or more digital computers or processors, by using application specific integrated circuits (ASICs), programmable logic devices, field programmable gate arrays (FPGAs), optical, chemical, biological, quantum or nano-engineered systems, components and mechanisms. Based on the disclosure and teachings representatively provided herein, a person skilled in the art will appreciate other ways or methods to implement the invention.

As used herein, the terms "comprises," "comprising," "includes," "including," "has," "having" or any contextual variants thereof, are intended to cover a non-exclusive inclusion. For example, a process, product, article, or apparatus that comprises a list of elements is not necessarily limited to only those elements, but may include other elements not expressly listed or inherent to such process, product, article, or apparatus. Further, unless expressly stated to the contrary, "or" refers to an inclusive or and not to an exclusive or. For example, a condition "A or B" is satisfied by any one of the following: A is true (or present) and B is false (or not present), A is false (or not present) and B is true (or present), and both A and B is true (or present).

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, reversed, or otherwise controlled by another process.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

What is claimed is:
1. A System on a Chip (SoC) comprising:
a plurality of general purpose processors;
a first plurality of application specific processors, the application specific processors being configured to implement convolutional neural network (CNN) engines;
a plurality of SoC support processing components;
a security processing subsystem (SCS);
a safety processor subsystem (SMS) configured to determine whether first output associated with the first plurality of application specific processors is in agreement with second output associated with a second plurality of application specific processors, wherein the first plurality of application specific processors and the second plurality of application specific processors are configured to operate on the same input data;
a general access Network on a Chip (NoC) coupled to and servicing communications between the plurality of general purpose processors and the plurality of SoC support components; and
a proprietary access NoC coupled to and servicing communications for the plurality of application specific processors, the SCS, and the SMS, wherein the proprietary access NoC communicatively isolates the application specific processors, the SCS, and the SMS from the general purpose processors,
wherein the application specific processors are additionally coupled to the general access NoC, and wherein the application specific processors use separate communication paths to the general access NoC than to the proprietary access NoC.

2. The SoC of claim 1, wherein:
the plurality of SoC support processing components includes at least a memory interface and an input/output (I/O) interface; and
the proprietary access NoC further couples to the memory interface and to the I/O interface to service communications therewith for the plurality of application specific processors and the SMS.

3. The SoC of claim 1, wherein the general access NoC and the proprietary access NoC isolate communications of the SCS from communications of the plurality of general purpose processors.

4. The SoC of claim 1, wherein the general access NoC and the proprietary access NoC isolate communications of the plurality of application specific processors from communications of the plurality of general purpose processors.

5. The SoC of claim 1, wherein:
the plurality of SoC support processing components includes at least a memory interface and an input/output (I/O) interface; and
the proprietary access NoC further couples to the memory interface and to the I/O interface to service communications therewith for the plurality of application specific processors and the SCS.

6. A System on a Chip (SoC) comprising:
a plurality of general purpose processors;
a first plurality of application specific processors, the application specific processors being configured to implement convolutional neural network (CNN) engines;
a plurality of SoC support processing components;
a security processing and safety processing subsystem (SCS/SMS) configured to determine whether first output associated with the first plurality of application specific processors is in agreement with second output associated with a second plurality of application specific processors, wherein the first plurality of application specific processors and the second plurality of application specific processors are configured to operate on the same input data;
a general access Network on a Chip (NoC) coupled to and servicing communications between the plurality of general purpose processors and the plurality of SoC support components; and
a proprietary access NoC coupled to and servicing communications for the plurality of application specific processors and the SCS/SMS,
wherein the application specific processors are additionally coupled to the general access NoC, and wherein the application specific processors use separate communication paths to the general access NoC than to the proprietary access NoC.

7. The SoC of claim 6, wherein:
the plurality of SoC support processing components includes at least a memory interface and an input/output (I/O) interface; and
the proprietary access NoC further couples to the memory interface and to the I/O interface to service communications therewith for the plurality of application specific processors and the SCS/SMS.

8. The SoC of claim 6, wherein the general access NoC and the proprietary access NoC isolate communications of the SCS/SMS from communications of the plurality of general purpose processors.

9. The SoC of claim 6, wherein the general access NoC and the proprietary access NoC isolate communications of the plurality of application specific processors from communications of the plurality of general purpose processors.

10. A method for operating a System on a Chip (SoC) comprising:
a general access Network on a Chip (NoC) servicing communications among a plurality of general purpose processors and a plurality of SoC support processing components;
a proprietary access NoC servicing communications among a plurality of application specific processors, a security processing subsystem (SCS), and a safety processor subsystem (SMS), the application specific processors being coupled to the proprietary access NoC and being configured to implement convolutional neural network (CNN) engines, wherein the proprietary access NoC communicatively isolates the application specific processors, the SCS, and the SMS from the general purpose processors,
wherein the application specific processors are additionally coupled to the general access NoC, and wherein the application specific processors use separate communication paths to the general access NoC than to the proprietary access NoC,
wherein the SMS is configured to determine whether first output associated with the first plurality of application specific processors is in agreement with second output associated with a second plurality of application specific processors, wherein the first plurality of application specific processors and the second plurality of application specific processors are configured to operate on the same input data; and
the general access NoC and the proprietary access NoC precluding communications between the plurality of general purpose processors and the SCS.

11. The method of claim 10, further comprising the general access NoC and the proprietary access NoC precluding communications between the plurality of general purpose processors and the plurality of application specific processors.

12. The method of claim 10, further comprising the proprietary access NoC selectively servicing communications between a memory interface and an I/O interface of the plurality of SoC support processing components, the plurality of application specific processors, the SCS, and the SMS.

13. The method of claim 10, further comprising the proprietary access NoC selectively servicing communications between a memory interface and an I/O interface of the plurality of SoC support processing components, the plurality of application specific processors, and the SCS.

14. A method for operating a System on a Chip (SoC) comprising:
- a general access Network on a Chip (NoC) servicing communications among a plurality of general purpose processors and a plurality of SoC support processing components;
- a proprietary access NoC servicing communications among a plurality of application specific processors and a security and safety processing subsystem (SCS/SMS), the application specific processors being coupled to the proprietary access NoC and being configured to implement convolutional neural network (CNN) engines, wherein the proprietary access NoC communicatively isolates the application specific processors, the SCS/SMS, from the general purpose processors,
- wherein the application specific processors are additionally coupled to the general access NoC, and wherein the application specific processors use separate communication paths to the general access NoC than to the proprietary access NoC,
- wherein the SCS/SMS is configured to determine whether first output associated with the first plurality of application specific processors is in agreement with second output associated with a second plurality of application specific processors, wherein the first plurality of application specific processors and the second plurality of application specific processors are configured to operate on the same input data; and
- the general access NoC and the proprietary access NoC precluding communications between the plurality of general purpose processors and the SCS/SMS.

15. The method of claim 14, further comprising the general access NoC and the proprietary access NoC precluding communications between the plurality of general purpose processors and the plurality of application specific processors.

16. The method of claim 14, further comprising the proprietary access NoC selectively servicing communications between a memory interface and an I/O interface of the plurality of SoC support processing components, the plurality of application specific processors, and the SCS/SMS.

* * * * *